United States Patent
Schümann et al.

(10) Patent No.: US 12,540,258 B2
(45) Date of Patent: Feb. 3, 2026

(54) LIGHT-CURING REACTIVE ADHESIVE FILM

(71) Applicant: tesa SE, Norderstedt (DE)

(72) Inventors: Uwe Schümann, Pinneberg (DE); Frank Hannemann, Hamburg (DE); Sebastian Dietze, Hamburg (DE); Tanita Czeski, Norderstedt (DE); André Rellmann-Sprink, Hamburg (DE)

(73) Assignee: tesa SE, Norderstedt (DE)

( * ) Notice: Subject to any disclaimer, the term of this patent is extended or adjusted under 35 U.S.C. 154(b) by 99 days.

(21) Appl. No.: 17/955,755

(22) Filed: Sep. 29, 2022

(65) Prior Publication Data

US 2023/0117532 A1 Apr. 20, 2023

(30) Foreign Application Priority Data

Sep. 30, 2021 (DE) .................... 10 2021 125 429.9

(51) Int. Cl.
*C09J 7/38* (2018.01)

(52) U.S. Cl.
CPC .......... *C09J 7/385* (2018.01); *C09J 2301/302* (2020.08); *C09J 2301/416* (2020.08); *Y10T 428/2809* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 3,096,202 A | 7/1963 | De Groot Von Arx | |
| 2015/0203451 A1* | 7/2015 | Klussmann | C07D 403/04 |
| | | | 548/209 |
| 2020/0362061 A1* | 11/2020 | Bonardi | C09B 23/04 |
| 2021/0403767 A1* | 12/2021 | Keite-Telgenbüscher | |
| | | | C08G 63/918 |
| 2023/0122417 A1* | 4/2023 | Jain | B01J 31/1616 |
| | | | 204/157.87 |
| 2024/0360344 A1* | 10/2024 | Strebl-Pfarr | C08F 265/06 |

FOREIGN PATENT DOCUMENTS

| | | | |
|---|---|---|---|
| DE | 10 2016 224 169 A1 | 6/2018 | |
| DE | 10 2019 209 513 A1 | 12/2020 | |
| EP | 3 757 183 A1 | 12/2020 | |
| KR | 10-2019-0087600 A | 7/2019 | |
| WO | WO-2018104053 A1 * | 6/2018 | .............. C09J 11/06 |

OTHER PUBLICATIONS

Jong-Ho Back et al., "Visible-Light-Curable Solvent-Free Acrylic Pressure-Sensitive Adhesive via Photoredox-Mediated Radical Polymerization", Molecues, published Jan. 13, 2021 (Year: 2021).*

Extended European Search Report for European Application No. 22193370.8, dated Feb. 28, 2023.

German Office Action, issued in Priority Application No. 10 2021 125 429.9, dated Mar. 17, 2022.

Römpp—Stichwort: Polyvinylpyrrolidone, https://roempp.thieme.de/lexicon/RD-16-03673?searchterm=polyvinylpyrrolidon&context=search [retrieved Mar. 17, 2022].

* cited by examiner

*Primary Examiner* — Anish P Desai
(74) *Attorney, Agent, or Firm* — Birch, Stewart, Kolasch & Birch, LLP

(57) ABSTRACT

The present invention relates to a light-curing, reactive, pressure-sensitive adhesive film of adhesive. With the film of adhesive of the invention, structural bond strengths can be achieved. The film of adhesive comprises (a) at least one reactive monomer or reactive resin, (b) an initiator, (c) a photoredox catalyst, (d) a polymer of monomers comprising N-vinyl compounds and (e) a film-forming polymer.

18 Claims, No Drawings

LIGHT-CURING REACTIVE ADHESIVE FILM

TECHNICAL FIELD OF THE INVENTION

The present invention relates to a light-curing, reactive, pressure-sensitive adhesive film of adhesive, whose curing is initiated by blue LED light or UV-LED light. The film of adhesive comprises (a) at least one reactive monomer or reactive resin, (b) an initiator, more particularly radical initiator, (c) a photoredox catalyst, (d) a polymer of monomers comprising N-vinyl compounds, and (e) a film-forming polymer. Additionally, a process for producing the reactive adhesive film of the invention, as described above, is provided. With the film of adhesive of the invention, structural bond strengths can be achieved. The adhesive film may be used for bonding diverse materials, such as, for example, plastic, metal, glass and/or ceramic. Bonds with this adhesive film are notable for high bond strength and high resistance to combined heat and humidity.

GENERAL PRIOR ART

On the basis of acrylic monomers, 2-component adhesive systems in particular have been known for years and described in depth in the technical literature. In these radically polymerizing systems, an adhesive film system consisting of two components is applied to the parts to be bonded, and usually two liquid components are employed. For example, one component consists of the monomers to be polymerized and an activator, and the other component of a radical-forming substance (also called curing agent or initiator) and the monomers to be polymerized. After the two components have been mixed or at least contacted, chemical reaction of the activator with the radical-forming substance produces at least one radical, and the polymerization reaction of the monomers to be polymerized begins. The radical chain polymerization of the monomer takes place subsequently up to a point of chain termination, and the adhesive accordingly cures, thereby achieving a permanent bond of the parts to be bonded.

2-Component adhesive systems based on acrylic monomers are likewise known in the form of pressure-sensitive adhesive films (adhesive tapes). They are described for example in EP 300847 A1, EP 3010989 A1, EP 3063243 A1, WO 2018104053 A1 and also in EP 3328951 A1. A substantial disadvantage of these films is the fact that there are two films which have to be brought form-fittingly into contact, and this may become a problem particularly when the faces to be bonded are very long and narrow and hence the corresponding adhesive films must also be very long and narrow.

One-component adhesive films based on acrylic monomers are likewise part of the commonly known prior art. These films are cured usually with light, especially UV light. The curing reaction in this case is started by means of a photoinitiator, which following the absorption of (UV) light decomposes in a photolysis reaction and so forms reactive species which trigger the radical polymerization. A disadvantage here may be the rapidity of the curing reaction, especially if the substrates to be bonded are non-transparent. As soon as the reaction is triggered, there is generally no longer sufficient time remaining to join the components to be bonded. Adhesive films of this kind are therefore suitable only for the bonding of (UV) transparent substrates, since in that case the irradiation can take place through the components after the components have been joined. Another disadvantage of this type of adhesive film is that the polymerization does not continue as a dark reaction.

DE 102019209513 A1 describes an adhesive film based on acrylic monomers that does not exhibit these depicted disadvantages of the prior art. A disadvantage which has emerged here is a resistance to combined heat and humidity that is insufficient for numerous applications.

EP 3390553 A1 proposes a process in which an adhesive tape composed of two mutually reacting layers A and B, separated from one another by a barrier layer, is brought to reaction and therefore curing by means of a laser, with the barrier layer being removed by exposure to the laser light. A disadvantage here is the requirement for laser light.

EP 3126402 A1 discloses a process in which a radical polymerization reaction is triggered by plasma treatment of an adhesive film comprising one substance which is reactive in a radical polymerization reaction and additionally one substance which is catalytically active. With this process, a sufficiently slow curing rate is achieved. A disadvantage is that a plasma device suitable for achieving good bond strengths is still not widely available on the market. Moreover, the achievable bond strength results are dependent on parameters which in some locations are difficult to influence, such as the atmospheric humidity, for example.

OBJECT OF THE PRESENT INVENTION

The present invention is based accordingly on the object of providing an improved, light-curing, reactive, pressure-sensitive adhesive film of adhesive with which it is possible to achieve high (known as structural) bond strengths and high resistances to combined heat and humidity. The curing is to be able to be initiated by blue LED light or UV-LED light. The adhesive film is to cure slowly enough to allow the parts to be bonded to be joined with a certain time spacing after the initiation, so that non-transparent components as well can be bonded. The adhesive film is also to continue to cure in the dark after the initiation and the joining of the components.

ACHIEVEMENT OF THE OBJECT

This object is achieved by means of a light-curing, reactive, pressure-sensitive adhesive film of adhesive according to the main claim, comprising (a) at least one reactive monomer or reactive resin, (b) an initiator, (c) a photoredox catalyst, (d) a polymer obtained by radical polymerization of monomers containing carbon-carbon double bonds, characterized in that these monomers comprise N-vinyl compounds, and (e) a film-forming polymer.

DETAILED DESCRIPTION OF THE INVENTION

The present invention relates to a light-curing, reactive, pressure-sensitive adhesive film of adhesive according to the main claim, comprising (a) at least one reactive monomer or reactive resin, (b) an initiator, (c) a photoredox catalyst, (d) a polymer obtained by radical polymerization of monomers containing carbon-carbon double bonds, characterized in that these monomers comprise N-vinyl compounds, and (e) a film-forming polymer. The light-curing, reactive, pressure-sensitive adhesive film of adhesive is preferably based on acrylic monomers. The curing is initiated by blue LED light or UV-LED light, and the adhesive film of the present invention preferably cures slowly enough to allow the components to be bonded to be joined as and when required, for example if non-transparent substrates are to be bonded, with a certain time spacing after the initiation, and which continues to cure even in the dark after bonding.

Reactive Monomer or Reactive Resin

As used herein, the reactive monomer or reactive resin is intended to represent a monomer or resin which is capable in particular of a radical chain polymerization.

A suitable reactive monomer or reactive resin is selected from at least one representative selected from acrylic esters (such as 2-ethylhexyl acrylate), methacrylic esters, vinyl compounds and/or oligomeric or polymeric compounds having carbon-carbon double bonds, and also crosslinking reactive monomers such as diacrylates, dimethacrylates, triacrylates, trimethacrylates, acrylates of higher functionality, and methacrylates of higher functionality. Reactive resin(s) selected may include oligomeric compounds with acrylate or methacrylate function, in which case the functionalization may be single or multiple. Very advantageously they are used in a mixture with at least one reactive monomer.

Preferred monomers in terms of high bond strength are acrylic esters and/or methacrylic esters in which the alcohol part of the ester contains aromatic structural elements, heteroatoms or functional groups. Preferred are urethane groups, urea groups, oxygen or nitrogen heterocycles, ether groups, ester groups, acid functions and/or hydroxyl functions. In terms of good resistance to combined heat and humidity, preference is likewise given to acrylic esters and/or methacrylic esters in which the alcohol part of the ester is a fatty alcohol. Additionally preferred in terms of high crosslinking density are crosslinking monomers.

Examples of preferred monomers are 2-phenoxyethyl acrylate (CAS No.: 48145-04-6), 2-phenoxyethyl methacrylate (CAS No.: 10595-06-9), 2-hydroxy-3-phenoxypropyl acrylate (CAS No.: 16969-10-1), 2-hydroxy-3-phenoxypropyl methacrylate (CAS No.: 16926-87-7), 2-[2-(methacryloyloxy)ethoxycarbonyl]benzoic acid (CAS No.: 27697-00-3), 2-[[(phenylamino)carbonyl]oxy]ethyl methacrylate (CAS No.: 51727-47-0), 2-tert-butyl-6-[(3-tert-butyl-2-hydroxy-5-methylphenyl)methyl]-4-methylphenyl prop-2-enoate (CAS No.: 61167-58-6), (5-ethyl-1,3-dioxan-5-yl)methyl acrylate (CAS No. 66492-51-1), (2-oxo-1,3-dioxolan-4-yl)methyl methacrylate, (CAS No.: 13818-44-5) di(ethylene glycol) 2-ethylhexyl ether acrylate (CAS No.: 117646-83-0), (2,2-dimethyl-1,3-dioxolan-4-yl)methyl prop-2-enoate (CAS No.: 13188-82-4), succinic acid mono-[2-(acryloyloxy)ethyl ester], (CAS No.: 50940-49-3) succinic acid mono-[2-(methacryloyloxy)ethyl ester](CAS No.: 20882-04-6), (2,2-pentamethylene-1,3-oxazolid-3-yl)ethyl methacrylate (CAS No.: 4203-89-8), 2-hydroxy-3-(prop-2-enoyloxy)propyl 2-methyl-2-propylhexanoate (CAS No.: 444649-70-1), 2-[[(butylamino)carbonyl]oxy]ethyl acrylate (CAS No.: 63225-53-6), stearyl acrylate (CAS No.: 4813-57-4), stearyl methacrylate (CAS No.: 32360-05-7), and also the crosslinking reactive monomers diurethane dimethacrylate (isomer mixture) (CAS No.: 72869-86-4), bisphenol A glycerolate dimethacrylate ((BIS-GMA, CAS No.: 1565-94-2), bisphenol A dimethacrylate (BIS-DMA, CAS No.: 3253-39-2), ethylene glycol diacrylate (CAS No.: 2274-11-5), ethylene glycol dimethacrylate (CAS-No.: 97-90-5), trimethyloylpropane propoxylate triacrylate (CAS No.: 53879-54-2), trimethyloylpropane triacrylate (CAS No.: 15625-89-5) and/or di(trimethylolpropane) tetraacrylate (CAS No.: 94108-97-1). Particularly preferred are 2-hydroxy-3-phenoxypropyl acrylate, 2-[[(butylamino)carbonyl]oxy]ethyl acrylate and diurethane dimethacrylate.

The fraction of the reactive monomer/reactive monomers and/or of the reactive resins/reactive resins is preferably in the range from about 10 to 80 weight percent (wt %), more preferably about 20 to 60 weight percent, based on the total mixture of the constituents of the reactive adhesive film of the invention. Most preferably about 30 to 50 weight percent of the reactive monomer/reactive monomers and/or of the reactive resin/reactive resins is used, based on the total mixture of the constituents of the reactive adhesive film. The total mixture of the constituents of the reactive adhesive film of the invention here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film of the invention. The same is also true of solvents which are already included in the raw materials available commercially.

Initiator, Especially Radical Initiator

As used herein, the term "initiator", more particularly radical initiator or radical-forming substance, represents a compound which is able to initiate a polymerization reaction or crosslinking polymerization reaction of the adhesive film. The initiator, more particularly radical initiator, however, takes part in the reaction events to a very small extent and therefore does not form a polymer fraction determining the properties of the bond.

In the present invention, an initiator, more particular radical initiator, is added to the reactive adhesive film of the invention. The initiator is preferably selected such that in the mixture with the reactive monomers and/or reactive resins at temperatures up to 90° C. it does not trigger a polymerization, even if the mixture is irradiated with UV or blue light. This is the case as long as no photoredox catalyst or other activating compound is added to the mixture.

Radical initiators are preferred. Accordingly the light-curing, reactive, pressure-sensitive adhesive film of adhesive of the invention in one preferred embodiment comprises a radical initiator as initiator (b). All of the radical initiators known in the prior art may be used. Preferred radical initiators are peroxides, more particularly hydroperoxides.

In one particularly preferred embodiment of the invention the radical initiator is an organic peroxide, such as peroxycarboxylic acids and hydroperoxides. Particularly preferred are hydroperoxides, more particularly diisopropylbenzene hydroperoxide (CAS No. 26762-93-6). Diisopropylbenzene hydroperoxide is used preferably in the form of a 50 weight percent solution of diisopropylhydroperoxide in diisopropylbenzene, available under the trade name Peroxan® IHP-50 (from Pergan GmbH, Bocholt, Germany). It is likewise possible to use α,α-dimethylbenzyl hydroperoxide, which is also known as cumene hydroperoxide (CAS No. 80-15-9). Additionally, it is also possible to use, for example, p-menthane hydroperoxide (CAS No. 26762-92-5), tert-amyl hydroperoxide (CAS No. 3425-61-4), tert-butyl hydroperoxide (CAS No. 75-91-2) or 1,1,3,3-tetramethylbutyl hydroperoxide (CAS No. 5809-08-5).

The fraction of the radical initiator is preferably in the range from about 0.1 to 10 wt %, more preferably about 0.2 to 4 wt %, based on the total mixture of the constituents of the reactive adhesive film of the invention. Most preferably about 0.5 to 2 wt % of radical initiator, based on the total mixture of the constituents of the reactive adhesive films, is used. The total mixture of the constituents of the reactive adhesive film of the invention here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film of the invention. The same is also true of solvents which may already be included in the raw materials available commercially.

Photoredox Catalyst

As used here, the term "photoredox catalyst" represents a light-sensitive or UV light-sensitive compound which, when excited by light or UV light, is able to mediate the transfer of electrons between chemical compounds that would otherwise react more slowly or not at all. In contrast to a photoinitiator, a photoredox catalyst does not break down into reactive cleavage products on irradiation with light or UV light, but is instead merely placed into an excited state, which in general is relatively long-lived and from which redox processes can be initiated or mediated. In the mixture with the reactive monomers and/or reactive resins at temperatures up to 90° C., the photoredox catalyst preferably does not trigger a polymerization, not even if the mixture is irradiated with UV or blue light. This is the case as long as no radical initiator or other initiating compound is added to the mixture. The photoredox catalyst is therefore not an initiator. On irradiation with UV or blue light, it merely activates the initiator, which then triggers the polymerization.

Photoredox catalysts used may be the photoredox catalysts known to the skilled person. Many of the most frequently used photoredox catalysts are polypyridyl transition metal complexes, of ruthenium and iridium, for example, such as, for example, Ru(bpm)$_3^{2+}$ (e.g. tris(2,2'-bipyrimide) ruthenium(II) dichloride), Ru(bpz)$_3^{2+}$ (e.g. tris(2,2'-bipyrazine)ruthenium bis(hexafluorophosphate)), Ru(bpy)$_3^{2+}$, Ru(phen)$_3^{2+}$ (e.g. dichlorotris(1,10-phenanthroline)ruthenium(II) chloride), Ir[dF(CF$_3$)ppy]$_2$(dtbbpy)+(e.g. [4,4'-bis (1,1-dimethylethyl)-2,2'-bipyridine-N1,N1']bis[3,5-difluoro-2-[5-(trifluoromethyl)-2-pyridinyl-N]phenyl-C] iridium(III) hexafluorophosphate), Ir(ppy)$_3$, Ir(ppy)$_2$(dtbbpy)$^+$ (e.g. [Ir(dtbbpy)(ppy)2][PF6]), Ir(Fppy)$_3$ or fac-Ir(ppy)$_3$ (fac-tris(2-phenylpyridine)iridium(III)). Copper complexes can also be used, however, such as Cu(dap)$^{2+}$ (e.g. copper 2,9-bis(4-methoxyphenyl)-1,10-phenanthroline chloride).

In one preferred embodiment of the invention, the photoredox catalyst is a transition metal catalyst with ruthenium as central atom and bipyridine or a singularly or multiply substituted bipyridine derivative as ligand. In another preferred embodiment of the invention, the photoredox catalyst is a transition metal complex with iridium as central atom and phenylpyridine or a singularly or multiply substituted phenylpyridine derivative as ligand.

In one particularly preferred embodiment of the invention, the photoredox catalyst is selected from the following:

i. [Tris(2,2'-bipyridyl)ruthenium(II)]$^{2+}$, [Ru(bpy)$_3$]$^{2+}$—Formula (Ia)

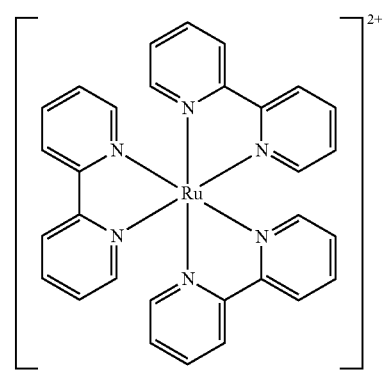

ii. Tris[2-(2,4-difluorophenyl)pyridine]iridium(III), Ir(Fppy)$_3$; CAS No.: 387859-70-3—Formula (Ib)

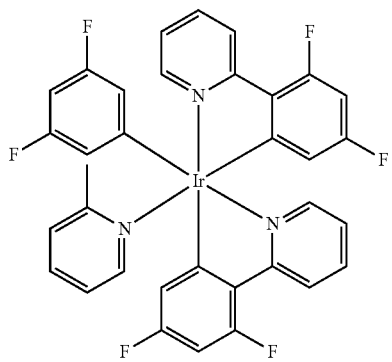

iii. Tris(2-phenylpyridinato)iridium(III), Ir(ppy)$_3$; CAS No.: 94928-86-6—Formula (Ic)

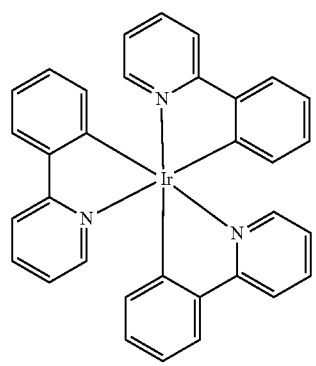

The preferred counterion to the cation of the formula (Ia) is chloride. The corresponding commercially available product includes water of crystallization. The particularly preferred embodiment of the photoredox catalyst of the formula (Ia) is therefore tris(2,2'-bipyridyl)ruthenium(II)chloride hexahydrate, (CAS No.: 50525-27-4), available from CHEMOS GmbH & Co. KG (Altdorf, Germany, http://www.chemos.de), and of the photoredox catalysts of the formula (Ic). The photoredox catalyst having the formula (Ib) is available from Strem (Europe) (Bischheim, France, http://www.strem.com).

The fraction of the photoredox catalyst is preferably in the range of up to about 1 wt %, more preferably up to 0.5 wt %, based on the total mixture of the constituents of the reactive adhesive film of the invention. Most preferably about 0.01-0.1 wt % of photoredox catalyst, based on the total mixture of the constituents of the reactive adhesive film. The total mixture of the constituents of the reactive adhesive film of the invention here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film of the invention. The same is also true of solvents which may already be included in the raw materials available commercially.

The light-curing, reactive, pressure-sensitive adhesive film of adhesive of the invention preferably contains no activating or initiating constituents, or constituents influencing the activation and initiation process, other than those stated in this specification.

Polymer of Monomers Comprising N-Vinyl Compounds

The reactive adhesive film of the invention comprises a polymer obtained by radical polymerization of monomers containing carbon-carbon double bonds, characterized in that these monomers comprise N-vinyl compounds. Typically 10 wt %, 20 wt %, 30 wt %, 40 wt %, 50 wt %, 60 wt %, 70 wt %, 80 wt %, 90 wt % or 100 wt % of the monomers of the polymer consist of N-vinyl compounds. Advantageously, at least 50 wt % or at least 80 wt %, preferably at least 90 wt %, more preferably 100 wt % of the monomers of the polymer are N-vinyl compounds. One preferred embodiment of the light-curing, reactive, pressure-sensitive adhesive film of adhesive of the invention is characterized in that at least 50 wt % of the monomers of the polymer (d) are N-vinyl compounds. More preferably, at least 50 wt % or at least 80 wt %, and more preferably still 100 wt %, of the monomers of the polymer (d) are N-vinyl compounds. The term "polymer" here is a generic term both for homopolymers and for copolymers. The polymer obtained by radical polymerization of monomers containing carbon-carbon double bonds itself contains no carbon-carbon double bond(s), or only such bonds as are formed as a result of chain termination reactions (disproportionation reactions). It is not a reactive resin. In particular, it is not capable of a radical chain polymerization.

The monomers containing carbon-carbon double bonds are preferably selected from acrylic acid, acrylic esters, methacrylic acid, methacrylic esters and/or vinyl compounds. Particularly preferred are linear alkyl acid esters having 2 to 10 carbon atoms in the alkyl radical. These are ethyl acrylate, n-propyl acrylate, n-butyl acrylate, n-pentyl acrylate, n-hexyl acrylate, n-heptyl acrylate, n-octyl acrylate, n-nonyl acrylate and n-decyl acrylate. Especially preferred is n-butyl acrylate.

Branched non-cyclic acrylic esters having 4 up to and including 12 carbon atoms in the alkyl radical of the alcohol are likewise preferably selected. Especially preferred are 2-ethylhexyl acrylate (EHA), 2-propylheptyl acrylate, isooctyl acrylate, isobutyl acrylate, isoamyl acrylate and/or isodecyl acrylate.

The N-vinyl compounds of the polymer are advantageously compounds corresponding to the formula (II) or comprise a structural unit of the formula (II),

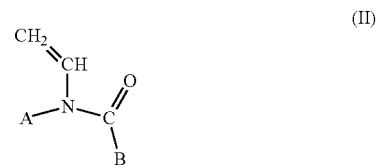

(II)

where
A is an organic radical R or H,
B is an organic radical R or H or OR or OH or $NR_2$ or NHR or $NH_2$,
R independently and at each occurrence is a substituted or unsubstituted branched, cyclic or linear $C_{1-20}$ alkyl radical or $C_{2-20}$ alkenyl radical; or is a substituted or unsubstituted aryl or heteroaryl,
A and B may form a ring, for example lactam or oxazolidinone.

Examples of such N-vinyl compounds are N-vinylacetamide (CAS No. 5202-78-8), N-vinylcaprolactam (CAS No.: 2235-00-9), N-vinylpyrrolidone (CAS No.: 88-12-0), N-vinyl-N-methylacetamide (CAS No. 3195-78-6), 5-methyl-3-vinyl-2-oxazolidinone (CAS No. 3395-98-0) or N-vinylisobutyramide. Preferred are N-vinyl-containing lactams and N-vinyl-containing oxazolidinones. It is advantageous if the N-vinyl compounds of the polymer (d) are N-vinylcaprolactam (CAS No.: 2235-00-9), N-vinylpyrrolidone (CAS No.: 88-12-0) or 5-methyl-3-vinyl-2-oxazolidinone (CAS No.: 3395-98-0). Preferred are N-vinylcaprolactam or N-vinylpyrrolidone, and in one particularly preferred implementation the light-curing, reactive, pressure-sensitive adhesive film of adhesive is characterized in that the N-vinyl compounds of the polymer (d) comprise N-vinylcaprolactam.

The fraction of the polymer of monomers comprising N-vinyl compounds is preferably in the range from about 1 to 50 wt %, more preferably approximately in the range from 5 to 30 wt %, based on the total mixture of the constituents of the reactive adhesive film of the invention. Even more preferably, 8 to 25 wt %, most preferably about 10 to 20 wt %, of the polymer of monomers comprising N-vinyl compounds is used, based on the total mixture of the constituents of the reactive adhesive film of the invention.

The total mixture of the constituents of the reactive adhesive film of the invention here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film of the invention. The same is also true of solvents which may already be included in the raw materials available commercially.

Film-Forming Polymer

The reactive adhesive film of the invention comprises a film-forming polymer. Without wishing to be tied to a particular theory, it is thought that the film-forming polymer physically binds the reactive monomers/reactive resins and the rest of the substances, or restricts their mobility. The film-forming polymer appears to act, as it were, like a sponge and to prevent or retard the flow of the reactive monomers/reactive resins and of the rest of the substances. The polymer is therefore intended to give the reactive adhesive film of the invention its film form and to stabilize that form. The film-forming polymer is to be substantially inert towards the reactive monomers/reactive resins and the rest of the substances. Inert in this context means that the reactive monomers/reactive resins, before the light curing under suitably chosen conditions, more particularly at room temperature (23° C.), substantially do not react with the film-forming polymer.

Suitable film-forming polymers for use in the present invention are thermoplastic polymers, such as polyurethanes, polyesters or copolyesters, polyamides or copolyamides, polyacrylic esters, acrylic acids/acrylic ester copolymers (such as a copolymer of n-butyl acrylate, ethyl acrylate and acrylic acid), polymethacrylic esters, and methacrylic acid/methacrylic ester copolymers. Chemically or particularly crosslinked substances of the aforesaid compounds are likewise conceivable. It is also possible, furthermore, to use blends of different thermoplastic polymers. In addition, elastomers, thermoplastic elastomers and thermosets are also conceivable, alone or a mixture, as film-forming polymers.

Preference is given to thermoplastic polymers having a crystalline melting temperature of less than 100° C. and/or a softening temperature of less than 100° C. The term "softening temperature" in this context represents the temperature from which the thermoplastic pellets stick to themselves. If the film-forming polymer is a semicrystalline thermoplastic polymer, then as well as its softening temperature (which is related to the melting of the crystallites) it very preferably has a glass transition temperature of at most 25° C., preferably at most 0° C.

In one preferred embodiment of the invention, a thermoplastic polyurethane is used. Examples of commercially available thermoplastic polyurethanes include Desmocoll® 530/1 and Desmocoll® 540/3 and also Desmomelt® 530 from Covestro AG (Leverkusen, Germany) or IROSTIC® S-6558-06 and IROSTIC® S 8612 from Huntsman (Huntsman Holland B.V., Botlek-Rotterdam, Netherlands) or alternative variants from these product lines. Additionally, there are the product lines Elastollan® from BASF (Ludwigshafen, Germany) or Pearlbond from Lubrizol (Lubrizol Advanced Materials Europe BVBA, Brussels, Belgium). The thermoplastic polyurethane preferably possesses a softening temperature of less than 100° C., more particularly less than 80° C. Preferred examples of such thermoplastic polyurethanes are Desmomelt® 530 and IROSTIC® S-6558-06. Desmomelt® 530 is a hydroxyl-terminated, largely linear, thermoplastic, highly crystallizing polyurethane elastomer. IROSTIC® S-6558-06 according to manufacturer indication is a linear thermoplastic polyurethane for solvent-borne adhesives. The features according to manufacturer indication are as follows: very low crystallization rate, long open time, very low activation temperature.

Particular preference is given to thermoplastic polyurethanes having a very low crystallization rate. Especially preferred are thermoplastic polyurethanes which in their DSC diagram between minus 140° C. and plus 250° C. in the second heating curve show no signal (peak) for a crystalline melting point. In one preferred embodiment, the light-curing, reactive, pressure-sensitive adhesive film of adhesive of the invention is characterized in that the film-forming polymer (e) is a thermoplastic polyurethane whose DSC diagram in the temperature range between minus 140° C. and plus 250° C. in the second heating curve shows no signal for a crystalline melting point. The heating, cooling and reheating here take place each at a heating rate of 10 kelvins per minute (for 10 mg sample quantity). The abbreviation DSC stands for the known thermoanalytic method of Differential Scanning Calorimetry according to DIN EN ISO 11357-1 to -8 (German versions: EN ISO 11357-1:2016, /-2:2020, /-3:2018, /-4:2021, /-5:2014, /-6:2018, /-7:2015 and /-8:2021). The method for determining the melting and crystallization temperatures and also the enthalpies of fusion and of crystallization is laid down in DIN EN ISO 11357-3:2018 (German version).

In a particularly preferred embodiment of the invention, IROSTIC® S-6558-06 is thus used as film-forming polymer since it has a very low crystallization rate and in the DSC diagram in the temperature range between minus 140° C. and plus 250° C. in the second heating curve shows no signal (peak) of a crystalline melting point.

The fraction of the film-forming polymer is preferably in a range from about 10 to 90%, more preferably about 20 to 60 wt %, based on the total mixture of the constituents of the reactive adhesive film of the invention. Even more preferably, 30 to 50 wt %, most preferably about 35 to 45 wt %, of the film-forming polymer is used, based on the total mixture of the constituents of the reactive adhesive film of the invention. The total mixture of the constituents of the reactive adhesive film of the invention here represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of further constituents optionally present, which is obtained as the sum total in weight percent (wt %). Solvents and/or water serve only for production and in this consideration are not counted as part of the total mixture of the constituents of the reactive adhesive film of the invention. The same is also true of solvents which may already be included in the raw materials available commercially.

Further Constituents of the Reactive Adhesive Film

The reactive adhesive film of the invention may optionally comprise further additives and/or auxiliaries which are known in the prior art. The fraction of the further additives and/or auxiliaries may be in the range from about 0 to about 20 wt %, preferably 0 to about 15 wt %, more preferably 0 to about 10 wt %, and most preferably 0 to about 5 wt %, based on the total mixture of the constituents of the reactive adhesive film of the invention. Examples of further additives and/or auxiliaries include fillers, dyes, nucleating agents, rheological additives (for example fumed silica), expandants, adhesion-boosting additives (adhesion promoters, especially silanes and tackifier resins), compounding agents, plasticizers and/or ageing inhibitors, light stabilizers and UV protectants, in the form of primary and secondary antioxidants, for example. The further constituents of the reactive adhesive films of the invention may at the same time also be reactive monomers. This may be the case, especially preferably, with silane adhesion promotors. Mention may be made in this context for example of 3-trimethoxysilylpropyl methacrylate (CAS No.: 2530-85-0), available under the trade name Dynasylan® MEMO (Evonik AG, Essen, Germany).

Reactive Adhesive Film

The light-curing, reactive, pressure-sensitive adhesive film of adhesive of the invention is present in the form of a film. As used herein, the term "adhesive film" (or else film of adhesive, layer of adhesive, foil of adhesive) is intended to embrace a completely or incompletely provided application of the light-curing reactive adhesive mixture as described hereinafter. For example, application of the adhesive in the form of dots, not fully covering the substrate surface(s) to be bonded, may likewise lead to permanent bonding in the sense of the present invention.

In one preferred embodiment, the light-curing reactive, pressure-sensitive film of adhesive of the invention comprises (a) 10 to 80 wt % of at least one reactive monomer or reactive resin, (b) 0.1 to 10.0 wt % of initiator, (c) up to 1.0 wt % of photoredox catalyst, (d) 1.0 to 50.0 wt % of polymer obtained by radical polymerization of monomers containing carbon-carbon double bonds, characterized in that these monomers comprise N-vinyl compounds, and (e) 10 to 90 wt % of film-forming polymer and also optionally (f) 0 to about 15 wt % of further additives and/or auxiliaries. More preferred still are (a) 20 to 60 wt % of at least one reactive monomer or reactive resin, (b) 0.2 to 4.0 wt % of initiator, (c) up to 0.5 wt % of photoredox catalyst, (d) 5.0 to 30.0 wt % of polymer obtained by radical polymerization of monomers containing carbon-carbon double bonds, characterized in that these monomers comprise N-vinyl compounds, and (e) 20 to 60 wt % of film-forming polymer and also optionally (f) 0 to about 10 wt % of further additives and/or auxiliaries. Most preferred are (a) about 39 wt % of at least one reactive monomer or reactive resin, (b) 1.3 wt % of initiator, (c) about 0.03 wt % of photoredox catalyst, (d) about 15 wt % of polymer obtained by radical polymerization of monomers containing carbon-carbon double bonds, characterized in that these monomers comprise N-vinyl compounds, (e) about 41 wt % of film-forming polymer, and (f) about 4% by weight of additive.

In one particularly preferred embodiment, the light-curing, reactive, pressure-sensitive adhesive film of adhesive of the invention comprises a mixture of the following constituents: thermoplastic polyurethane, especially Irostic® S-6558-06 or Desmomelt® 530, poly(N-vinylcaprolactam) or poly(N-vinylpyrrolidone), 2-hydroxy-3-phenoxypropyl acrylate or 2-[[(butylamino)carbonyl]oxy]ethyl acrylate, rheological additive, especially fumed silica, diisopropyl hydroperoxide and tris(2,2'-bipyridyl)ruthenium(II) chloride hexahydrate.

A particularly preferred embodiment contains about 35-45 wt % of the film-forming polymer, 10-20 wt % of poly(N-vinylcaprolactam) or poly(N-vinylpyrrolidone), 30-50 wt % of 2-hydroxy-3-phenoxypropyl acrylate or 2-[[(butylamino)carbonyl]oxy]ethyl acrylate, 2-5 wt % of rheological additive, 0.5-2.0 wt % of diisopropyl hydroperoxide and 0.01-0.1 wt % of tris(2,2'-bipyridyl)ruthenium(II) chloride hexahydrate, based on the total mixture of the constituents of the reactive adhesive film of the invention.

The total mixture of the constituents of the reactive adhesive film of the invention as used herein represents the total amount of the (a) reactive monomers/reactive resins used, (b) of the initiator, (c) of the photoredox catalyst, (d) of the polymer of monomers comprising N-vinyl compounds, (e) of the film-forming polymer, and also, optionally, of the further constituents optionally present, which is obtained as the sum total in weight percent (wt %). Solvents and/or water serve only for production and in this consideration are not counted as part of the total mixture of the constituents of the reactive adhesive film of the invention. The same is also true of solvents which may already be included in the raw materials available commercially.

The reactive adhesive film of the invention preferably possesses a layer thickness (measured using a standard commercial thickness-measuring instrument, e.g. DM 2000 from Wolf Messtechnik GmbH) in the range from about 20 to 200 µm, preferably about 30 to 100 µm, more preferably about 40 to 60 µm and very preferably about 50 µm. For producing greater layer thicknesses, it may be advantageous to laminate multiple adhesive-film layers together.

The reactive adhesive film of the invention is further characterized in that before the light curing it possesses pressure-sensitive adhesive properties. Pressure-sensitive adhesive compounds according to Römpp (Römpp Online 2013, document code RD-08-00162) are those viscoelastic adhesive films whose set dry film at room temperature is permanently tacky and remains adhesive. The pressure-sensitive adhesion is accomplished by gentle applied pressure immediately on virtually all substrates. A gentle applied pressure here refers to an applied pressure of greater than 0 bar exerted for a time of greater than 0 seconds.

The light-curing, reactive, pressure-sensitive adhesive film of adhesive of the invention may additionally comprise further films, foils, layers, carriers, films of adhesive, films of pressure-sensitive adhesive, release papers and/or release liners.

Suitable carrier materials are known to a skilled person in the field. For example, it is possible as permanent carriers to use foils (polyesters, PET, PE, PP, BOPP, PVC, polyimides), nonwovens, foams, woven fabrics and/or woven-fabric foils. Temporary carriers ought to be provided with a release layer, in which case the release layer consists generally of a silicone release varnish or fluorinated release varnish or is polyolefinic in character (HDPE, LDPE).

In one preferred embodiment of the invention, the reactive adhesive film (A1) of the invention together with a further reactive adhesive film (A2) of the invention and a film, a foil, a layer or a carrier (B) forms a reactive, pressure-sensitive adhesive tape. The reactive, pressure-sensitive adhesive tape of the invention comprises the layers (A1), (A2) and (B) and is characterized in that it comprises a light-curing, reactive, pressure-sensitive adhesive film of adhesive (A1) according to the present invention and a further light-curing, reactive, pressure-sensitive film of adhesive (A2) according to the present invention and also a film, a foil, a layer or a carrier (B) arranged flatly between the two reactive, pressure-sensitive adhesive films of adhesive. The adhesive tape may comprise further layers, such as light-curing, reactive, pressure-sensitive adhesive films of the present inventions or other adhesive layers or further carrier layers. The film, the foil, the layer or the carrier (B) is preferably a polyethylene, propylene or polyester foil, very particularly preferably a polyester foil etched with trichloroacetic acid.

In one particularly preferred embodiment of the adhesive tape, the film, the foil, the layer or the carrier (B) is arranged flatly between the two reactive, pressure-sensitive adhesive films (A1) and (A2), resulting in a three-layer reactive, pressure-sensitive adhesive tape in the layer arrangement (A1/B/A2). The reactive, pressure-sensitive adhesive tape (A1/B/A2) is characterized in that it comprises a light-curing, reactive, pressure-sensitive adhesive film (A1) according to the present invention and a further reactive, pressure-sensitive adhesive film (A2) according to the present invention and also a film, a foil, a layer or a carrier (B) arranged flatly between the two reactive, pressure-sensitive adhesive films (A1) and (A2). In a more preferred embodiment of the invention, the film, the foil, the layer or the carrier (B) arranged between the two reactive, pressure-sensitive adhesive films (A1) and (A2) of the invention is a polyethylene, polypropylene or polyester foil, very preferably a polyester foil etched with trichloroacetic acid. An etched polyester foil of this kind in a thickness of 12 µm is available for example under the trade name Kemafoil® HPH 100 12µ (from Coverne S.P.A, San Lazzaro di Savena, Italy).

Process for Producing a Reactive Adhesive Film

The production of the light-curing, reactive, pressure-sensitive adhesive film of the invention takes place at the latest following the addition of the photoredox catalyst with exclusion of UV light or visible light of the wavelength by which the respective photoredox catalyst is excited, more particularly violet light and blue light. In general, these are wavelengths of less than 500 nm. The exclusion may be achieved in general using standard commercial yellow-light lamps and also by masking normal light sources which have UV fractions and/or violet-light and blue-light fractions in their wavelength spectrum, using standard commercial UV-protection yellow-light foils.

The reactive adhesive film of the invention is produced by the processes described below: In a first step, the ingredients (constituents) are dissolved or finely divided in one or more solvents and/or water. Suitable solvents are known in the prior art, and solvents preferably used are those in which at least one of the ingredients has a good solubility. Particularly preferred are acetone and methyl ethyl ketone (MEK).

As used herein, the term "ingredient" embraces (a) at least one reactive monomer/reactive resin, (b) an initiator, (c) a photoredox catalyst, (d) a polymer obtained by radical polymerization of monomers containing carbon-carbon double bonds, characterized in that these monomers comprise N-vinyl compounds, (e) a film-forming polymer, and also optionally the further constituents present optionally, as defined above.

The dissolved or finely divided ingredients are subsequently mixed in a second step using customary stirring devices. At the same time, the ingredients are optionally dissolved, finely divided and mixed.

Thereafter, in a third step a film, a foil, a layer, a carrier, a film of adhesive, a film of pressure-sensitive adhesive, preferably a release liner or a release paper, is coated with a mixture of the dissolved, finely divided ingredients. Coating takes place according to the usual technologies, which are known in the prior art.

After coating has taken place, the solvent is removed in a fourth step by evaporation. This takes place preferably in the temperature range of 60-80° C., depending on the solvents used.

The reactive adhesive film may optionally be wound into a roll in a further step.

For storage, the reactive adhesive film of the invention is lined with a release liner or release paper.

A three-layer reactive, pressure-sensitive adhesive tape of the invention is produced by production of a first (A1) and a second (A2) reactive, pressure-sensitive adhesive film of the invention, with the two reactive, pressure-sensitive adhesive films of the invention being brought into contact with a film, a foil, a layer or a carrier (B), in either a laminating operation or by direct coating, to give a three-layer, reactive, pressure-sensitive adhesive tape in the layer arrangement (A1/B/A2).

Substrates

Substrates suitable for bonding with the reactive adhesive film of the invention are diverse plastics, metals, glass and/or ceramic. The substrates to be bonded may be alike or different. They may be transparent or non-transparent.

The reactive adhesive film of the invention is used preferably for the bonding of plastics, metals and glass. Bonded more preferably are polycarbonate, polyamide, anodized aluminium, steel (e.g. stainless steel) and glass (especially surface-treated glass).

The metal substrates to be bonded may be fabricated generally from all customary metals and metal alloys. Employed preferably are metals such as, for example, aluminium, stainless steel, steel, magnesium, zinc, nickel, brass, copper, titanium, ferrous metals and alloys. The parts to be bonded may additionally be constructed of different metals.

Suitable plastics substrates are, for example, polycarbonate (PC), polyamide (PA), acrylonitrile-butadiene styrene copolymers (ABS), ABS/PC blends, PMMA, glass fibre-reinforced polyamides, polyvinyl chloride, polyvinylene chloride, cellulose acetate, cycloolefin copolymers, liquid-crystal polymers (LCPs), polylactide, polyether ketones, polyetherimide, polyether sulfone, polymethacrylomethylimide, polymethylpentene, polyphenyl ether, polyphenylene sulfide, polyphthalamide, polyurethanes, polyvinyl acetate, styrene acrylonitrile copolymers, polyacrylates and polymethacrylates, polyoxymethylene, acrylate-styrene-acrylonitrile copolymers, polyethylene, polystyrene, polypropylene and/or polyesters, such as polybutylene terephthalate (PBT) and/or polyethylene terephthalate (PET), for example The substrates may have been printed or coated by surface coating, vapour coating or sputtering.

In terms of their form, the substrates to be bonded are preferably planar or two-dimensionally curved. Depending on the degree of curvature, however, three-dimensionally curved substrates may also be bonded with the reactive adhesive film of the invention. The substrates to be bonded may also adopt a wide variety of different functions, such as, for example, housings, viewing windows, stiffening elements, etc.

Optionally, it may be necessary for the surfaces of the substrates to be bonded to be pretreated by a physical, chemical and/or physico-chemical process. The application of a primer or of an adhesion promoter composition is advantageous here, for example. A corona, plasma or flame pretreatment may also be advantageous.

With the reactive adhesive film of the invention, it is possible advantageously to bond components in the electronics sector, especially smartphone and tablet components, such as touchscreens, for example. Preferred bonds are the securement of camera lenses, bonding of flexible displays in "wearables" (such as fitness trackers and smart watches, for example), securement/assembly of antennas or of background lighting units in smartphones or tablets, FPC (Flexible Printed Circuit) assembly or membrane lamination and assembly of speaker drivers.

Bonding Methods

The reactive adhesive film of the invention may be used in a method for bonding two substrates, e.g. substrate 1 (e.g. polycarbonate) with another substrate 2 (e.g. metal) to give a composite element. This method of the invention for bonding two substrates comprises the following steps: (i) providing the first substrate and the second substrate; (ii) arranging the reactive adhesive film of the invention or the reactive, pressure-sensitive adhesive tape of the invention on substrate 1; (iii) either before or after the arranging of the adhesive film or adhesive tape on substrate 1, irradiating the adhesive film or the adhesive tape with UV light or blue light, to form an irradiated adhesive film or an irradiated adhesive tape and to bring about curing; (iv) arranging the two substrates so that they are joined to one another by the irradiated adhesive film or the irradiated adhesive tape; and (v) after the arranging, curing the irradiated adhesive film or the irradiated adhesive tape as a result of the irradiating. Alternatively to this, the irradiating of step (iii) may also take place after the arranging or joining of the two substrates (iv).

Composite Elements

Further provided in the invention is a composite element comprising at least two bond faces, wherein the two bond faces are joined by the cured reactive adhesive film of the invention or by the cured reactive, pressure-sensitive adhesive tape, as defined above.

Product Properties

The reactive adhesive film of the invention exhibits outstanding product properties such as could not have been foreseen even by the skilled person. Depending on the photoredox catalyst used, the adhesive film may be cured using a standard commercial UV-LED lamp or a blue-light LED lamp (e.g. 365 nm, 385 nm, 395 nm, 405 nm, 450 nm and 460 nm wavelength). It has surprisingly been found that in many cases either a UV-LED lamp or a blue-light LED lamp is equally suitable. A standard commercial mercury vapour UV lamp may also be suitable.

Examples of suitable LED light sources for curing the reactive adhesive films of the invention include the following products from Hönle (Dr Hönle AG, Gilching, Germany, https://www.hoenle.de/):

a) LED Spot 100 HP IC 365 nm (UV-LED)
b) LED Spot 100 HP IC 460 nm (blue-light LED)

An irradiation chamber tailored to these light sources is the LED Cube 100 IC, likewise from Hönle. The suitable dose is approximately in the 10 to 80 J/cm$^2$ range. For this purpose, typically a power level of 30% to 90% is selected on the devices stated. The irradiation time selected is between 10 and 60 seconds. The distance between the light source and the reactive adhesive film of the invention is approximately 2 to 10 cm. When other devices with different powers are used, considerable deviations from the stated guideline values may be expected.

After irradiation has taken place, the film of adhesive does not cure instantaneously. Initially, it remains pressure-sensitive adhesive. The substrates can be bonded or joined within a period of at least five minutes, in some case even up to 30 minutes, depending on the photoredox catalyst used and on the exact adhesive formula. In other words: the adhesive film of the invention has an open time of at least five minutes after the irradiation and hence the initiation of the curing. The adhesive film of the invention cures fully within a period of approximately 24 hours after the end of irradiation. The curing takes place independently of light and therefore even in the dark. With the adhesive film/adhesive film of the invention, therefore, even non-transparent substrates can be bonded.

With the reactive adhesive film of the invention, high bond strengths are achieved. In push-out tests, it is possible to achieve values of more than 8 MPa in bonds of polycarbonate test specimens (see examples). Bonds of steel and anodized aluminium as well lead to similarly high bond strengths. Even polyamide, which is commonly considered to be a difficult-to-bond substrate, can be bonded well with the reactive adhesive film of the invention, even without pretreatment. In the push-out test, it is possible to achieve bond strengths of more than 5 MPa (see examples). This order of magnitude is referred to in the general jargon as "structural".

Surprisingly, it has been found that bonds with the reactive adhesive film of the invention are distinguished by high resistance to combined heat and humidity. The push-out strength of a cured bond after three-day storage of the bonded substrates at 60° C. and 95% relative humidity generally reaches at least 70% of the value prior to the hot-humid storage. After the hot-humid storage, indeed, the strengths achieved are frequently higher than those prior to the hot-humid storage.

EXPERIMENTAL SECTION

The examples below serve to illustrate the present invention, but should in no way be interpreted as limiting the scope of protection.

Table 1 lists the starting compounds and materials used for producing the light-curing, pressure-sensitive adhesive, reactive adhesive film of the invention, the three-layer light-curing, reactive, pressure-sensitive adhesive tape and also the comparative examples, the list including in each case trade name, indication of manufacturer or of purchase source, and the technical data relevant for this invention.

TABLE 1

Starting compounds and materials used for producing the light-curing, pressure-sensitive adhesive, reactive adhesive film of the invention, the three-layer, light-curing, reactive, pressure-sensitive adhesive tape, and the comparative examples

| Trade name | Description/explanation/abbreviation/CAS No. | Manufacturer/supplier |
|---|---|---|
| Monomers | | |
| 2-Hydroxy-3-phenoxy-propyl acrylate | CAS No.: 16969-10-1 | Sigma-Aldrich |
| GENOMER ® 1122TF | 2-[[(Butylamino)carbonyl]oxy]ethyl acrylate, CAS No.: 63225-53-6 | Rahn Chemie |
| Visiomer ® HEMATMDI | Diurethane dimethacrylate, isomer mixture, CAS No.: 72869-86-4 | Evonik |
| 4-Acryloylmorpholine | CAS No.: 5117-12-4 | Sigma-Aldrich |
| N-Vinylcaprolactam | CAS No.: 2235-00-9 | Sigma-Aldrich |
| Di(trimethylolpropane)-tetraacrylate | CAS No.: 94108-97-1 | Sigma-Aldrich |
| SR ® 531 | (5-Ethyl-1,3-dioxan-5-yl)methyl acrylate, CAS No.: 66492-51-1 | Sartomer-Arkema |
| 2-Ethylhexyl acrylate | CAS No.: 103-11-7 | Brenntag |
| Initiator | | |
| Peroxan ® IHP-50 | 50 weight per cent solution of diisopropyl hydro-peroxide (CAS No.: 26762-93-6) in diisopropylbenzene | Pergan GmbH |
| Photoredox catalyst | | |
| Tris(2,2'-bipyridyl) ruthenium(II) chloride hexahydrate | Ru(bpy)$_3$Cl$_2$•6H$_2$O; CAS No.: 50525-27-4 | Chemos GmbH |
| Tris[2-(2,4-difluoro-phenyl)pyridine] iridium(III) | Ir(Fppy)$_3$; CAS No.: 387859-70-3 | Strem Chemicals |
| Tris(2-phenylpyridinato) iridium(III) | Ir(ppy)$_3$; CAS No.: 94928-86-6 | Chemos GmbH |
| Polymer | | |
| N-Vinylcaprolactam | CAS No.: 2235-00-9 | Sigma-Aldrich |
| n-Butyl acrylate | CAS No.: 141-32-2 | Rohm and Haas |

TABLE 1-continued

Starting compounds and materials used for producing the light-curing, pressure-sensitive adhesive, reactive adhesive film of the invention, the three-layer, light-curing, reactive, pressure-sensitive adhesive tape, and the comparative examples

| Trade name | Description/explanation/ abbreviation/CAS No. | Manufacturer/ supplier |
|---|---|---|
| Vazo ® 67 | 2,2'-Azobis(2-methylbutyro-nitrile); CAS No.: 13472-08-7, initiator for producing the polymer | Chemours |
| Sokalan ® K30P | Poly(N-vinylpyrrolidone) in powder form, linear homopolymer, Mw: 50 000 g/mol; CAS No.: 9003-39-8 | BASF |
| Film-forming polymer | | |
| IROSTIC ® S-6558-06 | Linear polyurethane, very low crystallization rate | Huntsman Holland B. V. |
| Desmomelt ® 530 | Largely linear, highly crystallizing polyurethane elastomer | Covestro |
| n-Butyl acrylate | CAS No.: 141-32-2 | Rohm and Haas |
| Ethyl acrylate | CAS No.: 140-88-5 | Sigma-Aldrich |
| Acrylic acid | CAS No.: 79-10-7 | BASF |
| Carrier foil | | |
| Kemafoil ® HPH 100 12 μ | Polyester foil etched with trichloroacetic acid, thickness: 12 μm | Coveme S. P. A. |
| Further constituents | | |
| Aerosil ® R202 | Hydrophobized fumed silica; CAS No.: 7631-86-9 | Evonik A G, |
| Dynasylan ® MEMO | Trimethoxysilylpropyl methacrylate, CAS No.: 2530-85-0 | Evonik A G |

Additionally used were standard commercial siliconized release liners (release foils). Solvents used in the inventive and comparative examples were acetone (CAS No.: 67-64-1), methyl ethyl ketone (CAS No.: 78-93-3), isopropanol (CAS No.: 67-63-0) and fully demineralized water.

Producing a Solution of the Film-Forming Polymer

For practical reasons, first a solution of the film-forming polymer was produced.

Polyurethane (PU) Solution:

A 20% solution of the film-forming polymer was produced by first weighing out, alternatively, either 120 g of Irostic® S-6558-06 or 120 g of Desmomelt® 530 with 240 g of acetone and 240 g of methyl ethyl ketone into a screw-top jar and the jar was closed. The polyurethane was brought completely into solution by rolling of the jar on a commercial roller bench for a number of days. The process lasted about one to seven days depending on the rolling speed. Alternatively, the solution may also be produced by using a commercial laboratory stirrer to stir the polyurethane pellets in the mixture of acetone and methyl ether ketone.

Producing a Film-Forming Acrylate Copolymer Solution (Copolymer Designation: AC-1, Copolymer Solution Designation: AC-1 Solution)

A 10 L glass reactor conventional for radical polymerization was charged with 3.48 kg of n-butyl acrylate, 0.4 kg of ethyl acrylate, 0.12 kg of acrylic acid, 3.84 kg of acetone and 0.16 kg of isopropanol. The reactor was heated to a jacket temperature of 65° C. with stirring (70 rpm) and with nitrogen gas being passed through. When the internal temperature reached 58° C., 2.0 g of Vazo® 67 were added. After a further hour of stirring at a jacket temperature of 65° C., a further 2.0 g of Vazo® 67 were added. After 6 hours with further stirring at a jacket temperature of 65° C., the speed of the stirrer was lowered to 35 rpm. The reaction time was 20 hours. After this time, the solution was cooled to room temperature and diluted with acetone to a solids content of 40.0 percent by weight. The molar mass of the resulting copolymer was determined by thermal field-flow fractionation. Result:

Mn=155 000 g/mol, Mw=183 000 g/mol.

Producing a Polymer from Monomers Comprising N-Vinyl Compounds

In the case of poly(N-vinylpyrrolidone), the examples used the commercial pulverulent product Sokalan® K30P.

The other polymers were produced by radical polymerization from the monomers available commercially. To produce the reactive adhesive film of the invention, the polymer solution produced was used in these cases, without prior removal of the solvent.

Poly(N-Vinylcaprolactam) Solution:

A 10 L glass reactor conventional for radical polymerization was charged with 4.0 kg of N-vinylcaprolactam, 3.84 kg of acetone and 0.16 kg of isopropanol. The reactor was heated to a jacket temperature of 65° C. with stirring (70 rpm) and with nitrogen gas being passed through. When the internal temperature reached 58° C., 2.0 g of Vazo® 67 were added. After a further hour of stirring at a jacket temperature of 65° C., a further 2.0 g of Vazo® 67 were added. After 6 hours with further stirring at a jacket temperature of 65° C., the speed of the stirrer was lowered to 35 rpm. The reaction time was 20 hours. After this time, the solution was cooled to room temperature and diluted with acetone to a solids content of 40.0 percent by weight. The molar mass of the resulting poly(N-vinyllactam) was determined by thermal field-flow fractionation.

Result:

Mn=74 000 g/mol, Mw=116 500 g/mol.

Poly(N-Vinylcaprolactam/Butyl Acrylate) (50/50) Solution:

A 10 L glass reactor conventional for radical polymerization was charged with 2.0 kg of N-vinylcaprolactam, 2.0 kg of butyl acrylate, 3.84 kg of acetone and 0.16 kg of isopropanol. The reactor was heated to a jacket temperature of 65° C. with stirring (70 rpm) and with nitrogen gas being passed through. When the internal temperature reached 58° C., 2.0 g of Vazo® 67 were added. After a further hour of stirring at a jacket temperature of 65° C., a further 2.0 g of Vazo® 67 were added. After 6 hours with further stirring at a jacket temperature of 65° C., the speed of the stirrer was lowered to 35 rpm. The reaction time was 20 hours. After this time, the solution was cooled to room temperature and diluted with acetone to a solids content of 40.0 percent by weight. The molar mass of the resulting N-vinylcaprolactam/butyl acrylate copolymer was determined by thermal field-flow fractionation. Result:

Mn=83 000 g/mol, Mw=124 000 g/mol.

Poly(N-Vinylcaprolactam/Butyl Acrylate) (80/20) Solution:

A 10 L glass reactor conventional for radical polymerization was charged with 3.2 kg of N-vinylcaprolactam, 0.8 kg of butyl acrylate, 3.84 kg of acetone and 0.16 kg of isopropanol. The reactor was heated to a jacket temperature of 65° C. with stirring (70 rpm) and with nitrogen gas being passed through. When the internal temperature reached 58° C., 2.0 g of Vazo® 67 were added. After a further hour of stirring at a jacket temperature of 65° C., a further 2.0 g of Vazo® 67 were added. After 6 hours with further stirring at a jacket temperature of 65° C., the speed of the stirrer was lowered to 35 rpm. The reaction time was 20 hours. After this time, the solution was cooled to room temperature and diluted with acetone to a solids content of 40.0 percent by weight. The molar mass of the resulting N-vinylcaprolactam/butyl acrylate copolymer was determined by thermal field-flow fractionation. Result:

Mn=78 000 g/mol, Mw=120 500 g/mol.

Producing an Aqueous Photoredox Catalyst Solution

First, a 5 weight percent aqueous solution of this photoredox catalyst was produced.

Aqueous Tris(2,2'-Bipyridyl)Ruthenium(II) Chloride Hexahydrate Solution

Under yellow light, 5 g of tris(2,2'-bipyridyl)ruthenium (II) chloride hexahydrate and 95 g of fully demineralized water were weighed out into a brown screw-top jar. The jar was closed. The jar was rolled on a roller bench for 8 hours to bring the tris(2,2'-bipyridyl)ruthenium(II) chloride hexahydrate entirely into solution.

Example 1

Producing a Reactive Adhesive Film of the Invention and a Three-Layer Reactive Adhesive Tape of the Invention In a brown screw-top jar, 70.66 g of the 20 wt % solution of Desmomelt® 530 in acetone/methyl ethyl ketone (PU solution), 13.25 g of the 40 wt % poly(N-vinylcaprolactam) solution, 13.66 g of 2-hydroxy-3-phenoxypropyl acrylate, and 1.34 g of Aerosil® R202 were weighed out and mixed with a commercial laboratory stirrer for 15 minutes at medium speed (500-1000 rpm). Then, 0.88 g of Peroxan® IHP-50 (containing 50 wt % of diisopropyl hydroperoxide) was added. It was mixed in at medium speed for 5 minutes.

All further operations took place under yellow light. The overhead yellow-light lighting selected was the LT35WT5EQ/Yellow Special fluorescent lamp from NARVA Lichtquellen GmbH (NARVA Lichtquellen GmbH+Co. KG, Brand-Erbisdorf, Germany, www.narva-bel.de), which blocks wavelengths smaller than 500 nm. For masking of remaining residual light from other light sources, the Metolight SFLY-5 yellow foil (ASMETEC GmbH, Kirchheimbolanden, Germany, www.asmetec.de) was selected, which filters out wavelengths smaller than 470 nm. 0.21 g of the 5 wt % aqueous tris(2,2'-bipyridyl)ruthenium (II) chloride hexahydrate solution was added and was mixed in with the laboratory stirrer at medium speed for 5 minutes. The mixture was subsequently mixed further on a commercial roller bench for 24 hours.

The homogeneous mixture obtained was coated out three times in succession on a siliconized polyester foil (release liner) by means of a commercial laboratory coating bench (for example from SMO, Sondermaschinen Oschersleben GmbH, Oschersleben, Germany) with a coating knife, to give three films. The solvent was subsequently evaporated off in a forced-air drying cabinet at 60° C. for 15 minutes. The slot width during coating was varied. It was twice set such that the film obtained after evaporation of the solvent was 50 µm thick. In the third coating experiment, the slot width was set such that the film obtained after evaporation of the solvent was 100 µm thick. The light-curing, reactive, pressure-sensitively adhesive film of adhesive 100 µm thick that was obtained was lined with a second siliconized polyester foil (release liner). Then, circular diecuts (coupon) having a diameter of 21 mm were punched out from this product and kept in a light-proof plastic cannister prior to testing. Testing took place two weeks after production of the diecuts and also after six months' storage of the diecuts at 23° C. and 50% relative humidity.

To produce a three-layer reactive adhesive tape of the invention, the first of the two reactive adhesive films 50 µm thick was laminated to the trichloroacetic-acid-etched polyester foil Kemafoil® HPH 100 12µ. This was done at room temperature using, for example, a smooth laminating roller (pressing roller) under gentle applied pressure. Thereafter, the second reactive adhesive film 50 µm thick was laminated in the same way onto the other side of the trichloroacetic-acid-etched polyester foil. The resultant three-layer, light-curing, reactive, pressure-sensitive adhesive tape was lined on both sides with a respective siliconized polyester foil (release liner). Thereafter, ring-shaped diecuts with an outer diameter of 18 mm and an inner diameter of 13 mm were punched from this product. These diecuts as well were stored in a light-proof plastic cannister prior to testing. Here again, testing took place two weeks after production of the diecuts and also after six months' storage of the diecuts at 23° C. and 50% relative humidity.

The percentage composition of the initial weighings for producing the solution/mixture of the light-curing, reactive, pressure-sensitive adhesive film of adhesive, and also the percentage composition of the light-curing, reactive, pressure-sensitive adhesive film of adhesive itself, are set out in the two following tables.

Example 1: Percentage Composition of the Solution/Mixture for Producing the Reactive Adhesive Film

| Raw materials and raw material preparations including solvent | Weight per cent Initial weighing |
|---|---|
| 20 weight per cent Desmomelt ® 530 solution | 70.66 |
| 40 weight per cent poly(N-vinylcaprolactam) solution | 13.25 |
| 2-Hydroxy-3-phenoxypropyl acrylate | 13.66 |
| Aerosil ® R202 | 1.34 |
| Peroxan ® IHP-50 | 0.88 |
| 5 wt % tris(2,2'-bipyridyl)ruthenium(II) chloride hexahydrate solution | 0.21 |
| Total | 100.00 |

Example 1, Percentage Composition of the Reactive Adhesive Film

| Raw materials without solvent | Weight per cent Solid |
|---|---|
| Desmomelt ® 530 | 40.50 |
| Poly(N-vinylcaprolactam) | 15.19 |
| 2-Hydroxy-3-phenoxypropyl acrylate | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

The reactive adhesive films of the invention and the three-layer reactive adhesive tapes of the invention in the further inventive and comparative examples were produced in a manner analogous to that for Example 1.

The following tables provide information about the percentage compositions of the solutions/mixtures for producing the reactive adhesive films and the percentage compositions of the reactive adhesive films freed from the solvents in the further inventive and comparative examples.

Example 2: Percentage Composition of the Solution/Mixture for Producing the Reactive Adhesive Film

| Raw materials and raw material preparations including solvent | Weight per cent Initial weighing |
|---|---|
| 20 weight per cent IROSTIC ® S-6558-06 ® 530 solution | 70.66 |
| 40 weight per cent poly(N-vinylcaprolactam) solution | 13.25 |
| GENOMER ® 1122TF | 13.66 |
| Aerosil ® R202 | 1.34 |
| Peroxan ® IHP-50 | 0.88 |
| 5 wt % tris(2,2'-bipyridyl)ruthenium(II) chloride hexahydrate solution | 0.21 |
| Total | 100.00 |

Example 2, Percentage Composition of the Reactive Adhesive Film

| Raw materials without solvent | Weight per cent Solid |
|---|---|
| IROSTIC ® S-6558-06 | 40.50 |
| Poly(N-vinylcaprolactam) | 15.19 |
| GENOMER ® 1122TF | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

Example 3: Percentage Composition of the Solution/Mixture for Producing the Reactive Adhesive Film

| Raw materials and raw material preparations including solvent | Weight per cent Initial weighing |
|---|---|
| 20 weight per cent IROSTIC ® S-6558-06 solution | 70.66 |
| 40 weight per cent poly(N-vinylcaprolactam) solution | 13.25 |
| Visiomer ® HEMATMDI | 13.66 |
| Aerosil ® R202 | 1.34 |
| Peroxan ® IHP-50 | 0.88 |
| 5 wt % tris(2,2'-bipyridyl)ruthenium(II) chloride hexahydrate solution | 0.21 |
| Total | 100.00 |

Example 3, Percentage Composition of the Reactive Adhesive Film

| Raw materials without solvent | Weight per cent Solid |
|---|---|
| IROSTIC ® S-6558-06 | 40.50 |
| Poly(N-vinylcaprolactam) | 15.19 |
| Visiomer ® HEMATMDI | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

Example 4: Percentage Composition of the Solution/Mixture for Producing the Reactive Adhesive Film

| Raw materials and raw material preparations including solvent | Weight per cent Initial weighing |
|---|---|
| 20 weight per cent IROSTIC ® S-6558-06 solution | 70.76 |
| 40 weight per cent poly(N-vinylcaprolactam) solution | 13.27 |
| 2-Hydroxy-3-phenoxypropyl acrylate | 13.68 |
| Aerosil ® R202 | 1.34 |
| Peroxan ® IHP-50 | 0.88 |
| Tris(2-phenylpyridinato)iridium(III) | 0.07 |
| Total | 100.00 |

Example 4, Percentage Composition of the Reactive Adhesive Film

| Raw materials without solvent | Weight per cent Solid |
|---|---|
| IROSTIC ® S-6558-06 | 40.45 |
| Poly(N-vinylcaprolactam) | 15.16 |
| 2-Hydroxy-3-phenoxypropyl acrylate | 39.09 |
| Aerosil ® R202 | 3.84 |
| Diisopropyl hydroperoxide | 1.26 |
| Tris(2-phenylpyridinato)iridium(III) | 0.20 |
| Total | 100.00 |

Example 5: Percentage Composition of the Solution/Mixture for Producing the Reactive Adhesive Film

| Raw materials and raw material preparations including solvent | Weight per cent Initial weighing |
|---|---|
| 20 weight per cent IROSTIC ® S-6558-06 solution | 70.76 |
| 40 weight per cent poly(N-vinylcaprolactam) solution | 13.27 |
| 2-Hydroxy-3-phenoxypropyl acrylate | 13.68 |
| Aerosil ® R202 | 1.34 |
| Peroxan ® IHP-50 | 0.88 |
| Tris[2-(2,4-difluorophenyl)pyridine]iridium(III) | 0.07 |
| Total | 100.00 |

Example 5, Percentage Composition of the Reactive Adhesive Film

| Raw materials without solvent | Weight per cent Solid |
|---|---|
| IROSTIC ® S-6558-06 | 40.45 |
| Poly(N-vinylcaprolactam) | 15.16 |
| 2-Hydroxy-3-phenoxypropyl acrylate | 39.09 |
| Aerosil ® R202 | 3.84 |
| Diisopropyl hydroperoxide | 1.26 |
| Tris[2-(2,4-difluorophenyl)pyridine]iridium(III) | 0.20 |
| Total | 100.00 |

Example 6: Percentage Composition of the Solution/Mixture for Producing the Reactive Adhesive Film

| Raw materials and raw material preparations including solvent | Weight per cent Initial weighing |
|---|---|
| 20 weight per cent IROSTIC ® S-6558-06 solution | 70.66 |
| 40 weight per cent poly(N-vinylcaprolactam) solution | 13.25 |
| 2-Hydroxy-3-phenoxypropyl acrylate | 13.66 |
| Aerosil ® R202 | 1.34 |
| Peroxan ® IHP-50 | 0.88 |
| 5 wt % Tris(2,2'-bipyridyl)ruthenium(II) chloride hexahydrate solution | 0.21 |
| Total | 100.00 |

Example 6, Percentage Composition of the Reactive Adhesive Film

| Raw materials without solvent | Weight per cent Solid |
|---|---|
| IROSTIC ® S-6558-06 | 40.50 |
| Poly(N-vinylcaprolactam) | 15.19 |
| 2-Hydroxy-3-phenoxypropyl acrylate | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

Example 7: Percentage Composition of the Solution/Mixture for Producing the Reactive Adhesive Film

| Raw materials and raw material preparations including solvent | Weight per cent Initial weighing |
|---|---|
| 20 weight per cent IROSTIC ® S-6558-06 solution | 70.66 |
| 40 weight per cent poly(N-vinylcaprolactam) (50/50) solution | 13.25 |
| 2-Hydroxy-3-phenoxypropyl acrylate | 13.66 |
| Aerosil ® R202 | 1.34 |
| Peroxan ® IHP-50 | 0.88 |
| 5 wt % Tris(2,2'-bipyridyl)ruthenium(II) chloride hexahydrate solution | 0.21 |
| Total | 100.00 |

Example 7, Percentage Composition of the Reactive Adhesive Film

| Raw materials without solvent | Weight per cent Solid |
|---|---|
| IROSTIC ® S-6558-06 | 40.50 |
| Poly(N-Vinylcaprolactam/butyl acrylate) copolymer (50/50) | 15.19 |
| 2-Hydroxy-3-phenoxypropyl acrylate | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

Example 8: Percentage Composition of the Solution/Mixture for Producing the Reactive Adhesive Film

| Raw materials and raw material preparations including solvent | Weight per cent Initial weighing |
|---|---|
| 20 weight per cent IROSTIC ® S-6558-06 solution | 70.66 |
| 40 weight per cent Poly(N-vinylcaprolactam/butyl acrylate) (80/20) solution | 13.25 |
| 2-Hydroxy-3-phenoxypropyl acrylate | 13.66 |
| Aerosil ® R202 | 1.34 |
| Peroxan ® IHP-50 | 0.88 |
| 5 wt % Tris(2,2'-bipyridyl)ruthenium(II) chloride hexahydrate solution | 0.21 |
| Total | 100.00 |

Example 8, Percentage Composition of the Reactive Adhesive Film

| Raw materials without solvent | Weight per cent Solid |
|---|---|
| IROSTIC ® S-6558-06 | 40.50 |
| Poly(N-vinylcaprolactam/butyl acrylate) copolymer (80/20) | 15.19 |
| 2-Hydroxy-3-phenoxypropyl acrylate | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

Example 9: Percentage Composition of the Solution/Mixture for Producing the Reactive Adhesive Film

| Raw materials and raw material preparations including solvent | Weight per cent Initial weighing |
|---|---|
| 20 weight per cent IROSTIC ® S-6558-06 solution | 76.75 |
| Sokalan ® K30P | 5.76 |
| 2-Hydroxy-3-phenoxypropyl acrylate | 14.84 |
| Aerosil ® R202 | 1.46 |
| Peroxan ® IHP-50 | 0.96 |
| 5 wt % Tris(2,2'-bipyridyl)ruthenium(II) chloride hexahydrate solution | 0.23 |
| Total | 100.00 |

Example 9, Percentage Composition of the Reactive Adhesive Film

| Raw materials without solvent | Weight per cent Solid |
|---|---|
| IROSTIC ® S-6558-06 | 40.50 |
| Sokalan ® K30P | 15.19 |
| 2-Hydroxy-3-phenoxypropyl acrylate | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

Example 10: Percentage Composition of the Solution/Mixture for Producing the Reactive Adhesive Film

| Raw materials and raw material preparations including solvent | Weight per cent Initial weighing |
|---|---|
| 40 weight per cent AC-1 solution | 54.62 |
| 40 weight per cent poly(N-vinylcaprolactam) solution | 20.48 |
| 2-Hydroxy-3-phenoxypropyl acrylate | 21.12 |
| Aerosil ® R202 | 2.08 |
| Peroxan ® IHP-50 | 1.37 |
| 5 wt % Tris(2,2'-bipyridyl)ruthenium(II) chloride hexahydrate solution | 0.33 |
| Total | 100.00 |

Example 10, Percentage Composition of the Reactive Adhesive Film

| Raw materials without solvent | Weight per cent Solid |
|---|---|
| AC-1 | 40.50 |
| Poly(N-vinylcaprolactam) | 15.19 |
| 2-Hydroxy-3-phenoxypropyl acrylate | 39.16 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

Example 11: Percentage Composition of the Solution/Mixture for Producing the Reactive

| Raw materials and raw material preparations including solvent | Weight per cent Initial weighing |
|---|---|
| 20 weight per cent IROSTIC ® S-6558-06 solution | 70.65 |
| 40 weight per cent poly(N-vinylcaprolactam) solution | 13.25 |
| 2-Hydroxy-3-phenoxypropyl acrylate | 6.60 |
| 2-Ethyl hexyl acrylate | 7.07 |
| Aerosil ® R202 | 1.34 |
| Peroxan ® IHP-50 | 0.88 |
| 5 wt % Tris(2,2'-bipyridyl)ruthenium(II) chloride hexahydrate solution | 0.21 |
| Total | 100.00 |

Example 11, Percentage Composition of the Reactive Adhesive Film

| Raw materials without solvent | Weight per cent Solid |
|---|---|
| IROSTIC ® S-6558-06 | 40.50 |
| Poly(N-vinylcaprolactam) | 15.19 |
| 2-Hydroxy-3-phenoxypropyl acrylate | 18.91 |
| 2-Ethyl hexyl acrylate | 20.25 |
| Aerosil ® R202 | 3.85 |
| Diisopropyl hydroperoxide | 1.27 |
| Tris(2,2'-bipyridyl)ruthenium(II) chloride hexahydrate | 0.03 |
| Total | 100.00 |

COMPARATIVE EXAMPLES

Comparative Example 1: Percentage Composition of the Solution/Mixture

| Raw materials and raw material preparations including solvent | Weight per cent Initial weighing |
|---|---|
| 20 weight per cent IROSTIC ® S-6558-06 solution | 81.44 |
| 2-Hydroxy-3-phenoxy propyl acrylate | 15.75 |
| Aerosil ® R202 | 1.55 |
| Peroxan ® IHP-50 | 1.02 |
| 5 wt % Tris(2,2'-bipyridyl)ruthenium(II) chloride hexahydrate solution | 0.24 |
| Total | 100.00 |

Comparative Example 1, Percentage Composition of the Film

| Raw materials without solvent | Weight per cent Solid |
|---|---|
| IROSTIC ® S-6558-06 | 47.76 |
| 2-Hydroxy-3-phenoxypropyl acrylate | 46.17 |
| Aerosil ® R202 | 4.54 |
| Diisopropyl hydroperoxide | 1.49 |
| Tris(2,2'-bipyridyl)ruthenium(II) chloride hexahydrate | 0.04 |
| Total | 100.00 |

Comparative Example 2: Percentage Composition of the Solution/Mixture

| Raw materials and raw material preparations including solvent | Weight per cent Initial weighing |
|---|---|
| 20 weight per cent IROSTIC ® S-6558-06 solution | 81.44 |
| GENOMER ® 1122TF | 15.75 |
| Aerosil ® R202 | 1.55 |
| Peroxan ® IHP-50 | 1.02 |
| 5 wt % Tris(2,2'-bipyridyl)ruthenium(II) chloride hexahydrate solution | 0.24 |
| Total | 100.00 |

Comparative Example 2, Percentage Composition of the Film

| Raw materials without solvent | Weight per cent Solid |
|---|---|
| IROSTIC ® S-6558-06 | 47.76 |
| GENOMER ® 1122TF | 46.17 |
| Aerosil ® R202 | 4.54 |
| Diisopropyl hydroperoxide | 1.49 |
| Tris(2,2'-bipyridyl)ruthenium(II) chloride hexahydrate | 0.04 |
| Total | 100.00 |

Comparative Example 3, Percentage Composition of the Solution/Mixture

| Raw materials and raw material preparations including solvent | Weight per cent Initial weighing |
|---|---|
| 20 weight per cent Desmomelt ® 530 solution | 69.94 |
| 4-Acryloylmorpholine | 17.24 |
| N-Vinylcaprolactam | 4.66 |
| Di(trimethylolpropan)tetraacrylat | 1.41 |
| Dynasylan MEMO | 0.48 |
| Peroxan ® IHP-50 | 4.66 |
| 5 wt % Tris(2,2'-bipyridyl)ruthenium(II) chloride hexahydrate solution | 1.61 |
| Total | 100.00 |

Comparative Example 3, Percentage Composition of the Film

| Raw materials without solvent | Weight per cent Solid |
|---|---|
| Desmomelt ® 530 | 34.80 |
| 4-Acryloylmorpholine | 42.90 |
| N-Vinylcaprolactam | 11.60 |
| Di(trimethylolpropan) tetraacrylate | 3.50 |
| Dynasylan MEMO | 1.20 |
| Diisopropyl hydroperoxide | 5.80 |
| Tris(2,2'-bipyridyl)ruthenium(II) chloride hexahydrate | 0,.20 |
| Total | 100.00 |

Comparative Example 4: Percentage Composition of the Solution/Mixture

| Raw materials and raw material preparations including solvent | Weight per cent Initial weighing |
|---|---|
| 20 weight per cent Desmomelt ® 530 solution | 74.55 |
| 4-Acryloylmorpholine | 3.48 |
| SR ® 531 | 14.87 |
| Peroxan ® IHP-50 | 4.95 |
| 5 wt % Tris(2,2'-bipyridyl)ruthenium(II) chloride hexahydrate solution | 2.15 |
| Total | 100.00 |

Comparative Example 4: Percentage Composition of the Film

| Raw materials without solvent | Weight per cent Solid |
|---|---|
| Desmomelt ® 530 | 41.60 |
| 4-Acryloylmorpholine | 9.70 |
| SR ® 531 | 41.50 |
| Diisopropyl hydroperoxide | 6.90 |
| Tris(2,2'-bipyridyl)ruthenium(II) chloride hexahydrate | 0.30 |
| Total | 100.00 |

Push-Out Test

The push-out test provides information on the bond strength of a double-sidedly adhesive adhesive product in the direction of the adhesive layer normal.

Test Specimens for the Push-Out Test

Circular plaques (coupons) with a diameter of 21 mm were used.

Additionally used were square perforated plaques having a side length of 40 mm. The perforation is located in each case centrally in the middle. It is round and the perforation diameter is 9 mm in each case. The coupons used were made of polycarbonate and of SUS steel. The square perforated plaques used were made of polycarbonate, polyamide, anodized aluminium and of SUS steel.

The following specific test specimens were used:
a) coupons:
  plastic discs of polycarbonate (PC) Makrolon 099 milled to remove flash, 21×3 mm steel discs, steel grade VA1.4301 (corresponding to SUS 304), outer contour laser-cut, mirror-polished on one side, 21×2 mm b) square perforated plaques:

plastic specimens of polycarbonate (PC), product Makroform 099, 40×40×4 mm, hole in plastic centrally, D=9 mm plastic specimens of polyamide (PA), glass-fibre-reinforced, product PA6 pellets natural, 25% GF, Ultramid B3 WG5, 40×40×4 mm, hole in plastic centrally, D=9 mm specimens of aluminium (Al), alloy 5005A, AlMg1, anodized E6 EV1, 40×40×2 mm, hole in aluminium centrally, D=9 mm specimens of steel, steel grade VA1.4301 (corresponding to SUS 304), inner and outer contour laser-cut, surfaces mirror-polished, 40×40×3 mm, hole in steel centrally, D=9 mm The plastic and aluminium test specimens were obtained from Rocholl GmbH (Eschelbronn, Germany, https://rocholl.eu/). The supplier of the steel test specimens was Classen GmbH (Rellingen, Germany, www.classen-laser.de/).

Sample Preparation for the Push-Out Test

A distinction is made between the single-layer, light-curing, reactive, pressure-sensitive adhesive films of adhesive of the invention, present in the form of circular diecuts (coupons) 100 µm thick, and the three-layer reactive adhesive tapes of the invention, which consist of two reactive films 50 µm thick and of the trichloroacetic-acid-etched polyester foil 12 µm thick, arranged in the middle between the two reactive films 50 µm thick, and present in the form of punched rings.

The release liners of the diecuts were removed in each case from one side of the diecuts. The diecuts were each placed centrally in the middle onto a test specimen coupon. The diecuts then adhered to the test specimen coupons.

Thereafter, the release paper still remaining on the diecuts was removed. The test specimen coupons were therefore now equipped with the single-layer reactive adhesive films (coupons) and with the three-layer reactive adhesive tapes (rings).

Irradiation for the Push-Out Test

The irradiations took place in a first experimental series exclusively with UV-LED light (365 nm) and in a second experimental series exclusively with a blue-light LED (460 nm).

The dose was selected as follows:

LED Spot 100 HP IC 365 nm (UV-LED): 25.0-28.0 J/cm$^2$
LED Spot 100 HP IC 460 nm (blue-light LED): 50.0-55.0 J/cm$^2$ The dose of the UV-LED light was measured using an EIT UV Power Puck II (UV-A) from UVECO (Bruckmühl, Germany, www.uveco.de). The dose of the blue-light LED was measured with a UV-meter and the surface sensor VIS F1 (360-550 nm) from Hönle.

The timespan between the end of the irradiation and the joining of the test specimens was always between one and two minutes. A number of checks were carried out and it was ascertained that time differentiations of at least 5 minutes or more are also possible without deterioration in the bond strengths.

Bonding for the Push-Out Test

The test specimen coupons equipped with the irradiated diecuts were positioned with the respective exposed side of the diecuts on the perforated plaque such that the centre point of the coupon and the centre point of the perforation of the perforated plaque lay one above the other. The assembly held together by the pressure-sensitive adhesiveness of the diecuts and composed of square perforated plaque, irradiated diecut and the test specimen coupon was subsequently pressed using a press from Howe Elektrotechnik e.K. (Glinde, Germany, https://howe-hamburg.de/). The pressing parameters were as follows: 3 bar, 30 seconds.

After the pressing operation, the assembly was stored for 24 hours at 23° C. and 50% relative humidity (r.h.). During this time, there was a gradually progressing curing reaction within the diecuts and a gradually intensifying adhesion between the diecuts and the test specimens. Accordingly, there was bonding with a gradual increase in strength over time. The push-out tests were then performed (fresh values).

Further, corresponding adhesive assemblies were stored, after a 24-hour cure time, in a commercial conditioning chamber for 3 days (d) at 60° C. and 95% relative humidity. The bonded assemblies were subsequently stored (reconditioned) for 1 hour at 23° C. and 50% relative humidity. The push-out tests then took place for the purpose of assessing the hot-humid resistance of the bonds.

In order to assess the storage stability, unirradiated and unbonded diecuts lined with release liners on both sides were stored in the dark for six months at 23° C. and 50% relative humidity. The diecuts were then irradiated and bonded as described above. The push-out tests were then performed.

Further unirradiated and unbonded diecuts lined with release liners on both sides, following a six-month storage time in the dark at 23° C. and 50% relative humidity, were likewise irradiated and bonded as described above. After a 24-hour cure time, the bonded assemblies were stored in a commercial conditioning chamber for 3 days at 60° C. and 95% relative humidity. The bonded assemblies were subsequently stored (reconditioned) for 1 hour at 23° C. and 50% relative humidity. The push-out tests were then performed for the purpose of assessing the hot-humid resistance of the bonds of the six-month-old diecuts.

In summary, the following combinations of storage and hot-humid treatments were implemented:

| Designation in the push-out results tables for the inventive and comparative examples | Storage times and conditions of the unbonded diecuts | Hot-humid treatment of the bonded assemblies |
|---|---|---|
| 14 d standard conditions | 14 days/23° C./50% r.h. | none |
| 14 d standard conditions// 3 d 60° C./95% r.h. | 14 days/23° C./50% r.h. | 3 days/60° C./ 95% r.h. |
| 6 months standard conditions | 6 months/23° C./50% r.h. | none |
| 6 months standard conditions// 3 d 60° C./95% r.h. | 6 months/23° C./50% r.h. | 3 days/60° C./ 95% r.h. |

The test specimens were bonded in the following combinations:

PC coupon against PC plaque
PC coupon against PA plaque
PC coupon against Al plaque
Steel coupon against steel plaque The bond areas were as follows:

Circular diecuts (coupons): 283 mm$^2$ (taking account of the 9 mm perforation in the plaques)
Ring-shaped diecuts: 122 mm$^2$ Procedure of the Push-Out Test Pressure was applied to the test specimen coupon by means of a mandrel clamped into a tensile testing machine, through the perforation in the perforated plaque, at a constant rate of 10 mm/min, perpendicularly (i.e. parallel to the normal vector onto the plane of the test specimen; centred centrally onto the middle of the perforation), until the bond had parted to an extent such that a pressure drop of 50% was recorded. The pressure acting immediately before the pressure drop is the maximum pressure $P_{max}$. This value corresponds to the push-out value [MPa] reported in the table. All measurements were carried out in a temperature-controlled chamber at 23° C. and 50% relative humidity (r.h.).

Push-Out Results
For all Inventive Examples:
Mean values from 3 individual determinations with standard deviation in each case.
Fracture Modes:
A=adhesive
K=cohesive
M=mixed fracture Example 1

| | Test specimen | | | |
|---|---|---|---|---|
| Units | PC/PC [MPa] | PC/PA [MPa] | PC/Al [MPa] | Steel/steel [MPa] |
| | Single-layer product (coupon), UV light (365 nm) | | | |
| 14 d standard conditions | 6.2 ± 0.5 (C) | 4.3 ± 0.6 (M) | 5.7 ± 0.6 (C) | 6.4 ± 0.7 (C) |
| 14 d standard conditions// 3 d 60° C./95% r.h. | 5.5 ± 0.6 (C) | 3.8 ± 0.6 (M) | 4.6 ± 0.7 (M) | 6.0 ± 0.8 (C) |
| 6 months standard conditions | 2.2 ± 0.8 (A) | 1.5 ± 0.8 (A) | 2.1 ± 0.7 (A) | 2.8 ± 0.9 (M) |
| 6 months standard conditions// 3 d 60° C./95% r.h. | 1.8 ± 0.6 (A) | 1.4 ± 0.5 (A) | 2.0 ± 0.6 (A) | 2.4 ± 0.7 (A) |
| | Single-layer product (coupon), blue light (460 nm) | | | |
| 14 d standard conditions | 5.9 ± 0.6 (C) | 4.3 ± 0.6 (M) | 6.1 ± 0.8 (C) | 6.0 ± 0.7 (C) |
| 14 d standard conditions// 3 d 60° C./95% r.h. | 5.0 ± 0.7 (C) | 3.5 ± 0.7 (M) | 5.4 ± 0.9 (M) | 5.9 ± 0.7 (C) |
| 6 months standard conditions | 2.1 ± 0.8 (M) | 1.0 ± 0.8 (A) | 2.2 ± 0.7 (A) | 3.1 ± 0.9 (M) |
| 6 months standard conditions// 3 d 60° C./95% r.h. | 1.7 ± 0.7 (A) | 0.8 ± 0.6 (A) | 1.9 ± 0.8 (A) | 2.7 ± 0.7 (A) |
| | Three-layer product (ring), UV light (365 nm) | | | |
| 14 d standard conditions | 7.0 ± 0.5 (C) | 4.6 ± 0.7 (M) | 5.8 ± 0.8 (C) | 6.2 ± 0.7 (C) |
| 14 d standard conditions// 3 d 60° C./95% r.h. | 6.3 ± 0.7 (C) | 4.0 ± 0.6 (C) | 5.3 ± 0.7 (C) | 5.5 ± 0.8 (C) |
| 6 months standard conditions | 2.6 ± 0.6 (M) | 1.4 ± 0.7 (A) | 2.1 ± 0.7 (A) | 3.1 ± 0.8 (M) |
| 6 months standard conditions// 3 d 60° C./95% r.h. | 2.4 ± 0.7 (A) | 1.7 ± 0.7 (A) | 1.9 ± 0.9 (A) | 2.8 ± 0.7 (A) |
| | Three-layer product (ring), blue light (460 nm) | | | |
| 14 d standard conditions | 7.1 ± 0.4 (C) | 4.8 ± 0.6 (C) | 6.6 ± 0.7 (C) | 7.2 ± 0.5 (C) |
| 14 d standard conditions// 3 d 60° C./95% r.h. | 6.8 ± 0.5 (C) | 4.4 ± 0.7 (C) | 6.1± 0.4 (C) | 7.1 ± 0.5 (C) |
| 6 months standard conditions | 2.4 ± 0.7 (M) | 1.9 ± 0.9 (A) | 2.5 ± 0.6 (A) | 3.6 ± 0.8 (M) |
| 6 months standard conditions// 3 d 60° C./95% r.h. | 2.1 ± 0.5 (M) | 2.2 ± 0.5 (A) | 2.4 ± 0.7 (A) | 3.1 ± 0.8 (M) |

Example 2

| | Test specimen | | | |
|---|---|---|---|---|
| Unit | PC/PC [MPa] | PC/PA [MPa] | PC/Al [MPa] | Steel/steel [MPa] |
| | Single-layer product (coupon), UV light (365 nm) | | | |
| 14 d standard conditions | 5.6 ± 0.4 (C) | 4.1 ± 0.6 (M) | 4.1 ± 0.5 (M) | 4.9 ± 0.4 (C) |
| 14 d standard conditions// 3 d 60° C./95% r.h. | 5.2 ± 0.7 (C) | 3.8 ± 0.8 (A) | 3.6 ± 0.6 (M) | 4.7 ± 0.8 (C) |
| 6 months standard conditions | 5.2 ± 0.6 (C) | 3.7 ± 0.5 (M) | 4.0 ± 0.4 (M) | 5.2 ± 0.8 (C) |
| 6 months standard conditions// 3 d 60° C./95% r.h. | 5.1 ± 0.7 (C) | 3.2 ± 0.7 (A) | 3.7 ± 0.8 (M) | 4.5 ± 0.7 (C) |
| | Single-layer product (coupon), blue light (460 nm) | | | |
| 14 d standard conditions | 5.6 ± 0.5 (C) | 4.0 ± 0.7 (M) | 4.3 ± 0.7 (M) | 5.1 ± 0.5 (C) |
| 14 d standard conditions// 3 d 60° C./95% r.h. | 5.1 ± 0.5 (C) | 3.4 ± 0.6 (A) | 3.8 ± 0.7 (M) | 4.7 ± 0.6 (C) |
| 6 months standard conditions | 5.0 ± 0.6 (C) | 3.6 ± 0.6 (M) | 4.1 ± 0.4 (M) | 4.6 ± 0.6 (C) |
| 6 months standard conditions// 3 d 60° C./95% r.h. | 4.9 ± 0.6 (C) | 3.2 ± 0.6 (M) | 3.8 ± 0.6 (M) | 4.6 ± 0.5 (C) |

-continued

|  | Test specimen | | | |
|---|---|---|---|---|
| Unit | PC/PC [MPa] | PC/PA [MPa] | PC/Al [MPa] | Steel/steel [MPa] |
| Three-layer product (ring), UV light (365 nm) | | | | |
| 14 d standard conditions | 6.1 ± 0.5 (C) | 4.5 ± 0.4 (M) | 4.9 ± 0.4 (M) | 5.7 ± 0.5 (C) |
| 14 d standard conditions// 3 d 60° C./95% r.h. | 5.8 ± 0.5 (C) | 4.2 ± 0.4 (A) | 4.5 ± 0.6 (A) | 5.0 ± 0.6 (C) |
| 6 months standard conditions | 5.5 ± 0.6 (C) | 4.0 ± 0.6 (A) | 4.4 ± 0.5 (A) | 5.6 ± 0.7 (C) |
| 6 months standard conditions// 3 d 60° C./95% r.h. | 5.4 ± 0.6 (C) | 4.1 ± 0.5 (A) | 4.1 ± 0.7 (M) | 4.8 ± 0.5 (C) |
| Three-layer product (ring), blue light (460 nm) | | | | |
| 14 d standard conditions | 6.2 ± 0.4 (C) | 4.3 ± 0.6 (M) | 4.8 ± 0.5 (M) | 5.4 ± 0.4 (C) |
| 14 d standard conditions// 3 d 60° C./95% r.h. | 6.3 ± 0.3 (C) | 4.0 ± 0.5 (A) | 4.2 ± 0.5 (A) | 5.7 ± 0.5 (C) |
| 6 months standard conditions | 5.8 ± 0.5 (C) | 4.3 ± 0.7 (M) | 4.1 ± 0.5 (M) | 5.1 ± 0.7 (C) |
| 6 months standard conditions// 3 d 60° C./95% r.h. | 5.4 ± 0.5 (C) | 3.6 ± 0.9 (M) | 3.9 ± 0.8 (M) | 5.5 ± 0.6 (C) |

Example 3

|  | Test specimen | | | |
|---|---|---|---|---|
| Unit | PC/PC [MPa] | PC/PA [MPa] | PC/Al [MPa] | Steel/steel [MPa] |
| Single-layer product (coupon), UV light (365 nm) | | | | |
| 14 d standard conditions | 4.0 ± 0.4 (C) | 2.6 ± 0.5 (M) | 2.6 ± 0.6 (M) | 3.3 ± 0.7 (C) |
| 14 d standard conditions// 3 d 60° C./95% r.h. | 5.8 ± 0.4 (C) | 2.5 ± 0.5 (A) | 3.0 ± 0.5 (M) | 4.0 ± 0.7 (C) |
| 6 months standard conditions | 4.3 ± 0.6 (C) | 2.6 ± 0.7 (M) | 2.1 ± 0.5 (M) | 3.0 ± 0.5 (C) |
| 6 months standard conditions// 3 d 60° C./95% r.h. | 4.1 ± 0.5 (C) | 2.8 ± 0.8 (A) | 2.5 ± 0.4 (A) | 2.9 ± 0.9 (C) |
| Single-layer product (coupon), blue light (460 nm) | | | | |
| 14 d standard conditions | 4.2 ± 0.4 (C) | 2.8 ± 0.5 (M) | 2.8 ± 0.5 (M) | 3.6 ± 0.8 (C) |
| 14 d standard conditions// 3 d 60° C./95% r.h. | 5.4 ± 0.5 (C) | 3.1 ± 0.5 (M) | 2.8 ± 0.5 (M) | 3.7 ± 0.6 (C) |
| 6 months standard conditions | 3.9 ± 0.3 (C) | 2.7 ± 0.6 (M) | 2.7 ± 0.7 (M) | 3.0 ± 0.6 (C) |
| 6 months standard conditions// 3 d 60° C./95% r.h. | 3.7 ± 0.9 (C) | 2.4 ± 0.6 (A) | 2.2 ± 0.7 (A) | 2.8 ± 0.5 (M) |
| Three-layer product (ring), UV light (365 nm) | | | | |
| 14 d standard conditions | 4.6 ± 0.4 (C) | 2.8 ± 0.3 (M) | 2.2 ± 0.6 (M) | 3.9 ± 0.5 (C) |
| 14 d standard conditions// 3 d 60° C./95% r.h. | 5.8 ± 0.4 (C) | 3.3 ± 0.6 (M) | 3.2 ± 0.5 (M) | 4.3 ± 0.6 (C) |
| 6 months standard conditions | 4.0 ± 0.3 (C) | 2.9 ± 0.6 (M) | 2.6 ± 0.4 (M) | 3.5 ± 0.6 (C) |
| 6 months standard conditions// 3 d 60° C./95% r.h. | 3.9 ± 0.5 (C) | 2.6 ± 0.5 (A) | 2.4 ± 0.6 (A) | 3.7 ± 0.6 (C) |
| Three-layer product (ring), blue light (460 nm) | | | | |
| 14 d standard conditions | 4.4 ± 0.5 (C) | 3.0 ± 0.4 (M) | 2.9 ± 0.5 (M) | 3.8 ± 0.6 (C) |
| 14 d standard conditions// 3 d 60° C./95% r.h. | 5.7 ± 0.3 (C) | 3.2 ± 0.6 (M) | 3.2 ± 0.6 (M) | 4.1 ± 0.7 (C) |
| 6 months standard conditions | 4.3 ± 0.4 (C) | 2.9 ± 0.5 (M) | 2.7 ± 0.6 (M) | 3.3 ± 0.6 (C) |
| 6 months standard conditions// 3 d 60° C./95% r.h. | 4.0 ± 0.8 (M) | 2.8 ± 0.4 (A) | 2.9 ± 0.5 (A) | 3.6 ± 0.8 (C) |

Example 4

| Unit | Test specimen | | | |
|---|---|---|---|---|
| | PC/PC [MPa] | PC/PA [MPa] | PC/Al [MPa] | Steel/steel [MPa] |
| Single-layer product (coupon), UV light (365 nm) | | | | |
| 14 d standard conditions | 3.4 ± 0.4 (A) | 2.1 ± 0.3 (A) | 2.9 ± 0.5 (A) | 1.9 ± 0.8 (A) |
| 14 d standard conditions// 3 d 60° C./95% r.h. | 3.3 ± 0.3 (A) | 1.9 ± 0.4 (A) | 2.6 ± 0.4 (A) | 1.6 ± 0.6 (A) |
| 6 months standard conditions | 3.1 ± 0.5 (C) | 2.0 ± 0.3 (A) | 2.6 ± 0.4 (C) | 1.6 ± 0.4 (M) |
| 6 months standard conditions// 3 d 60° C./95% r.h. | 3.0 ± 0.7 (M) | 1.7 ± 0.5 (A) | 2.7 ± 0.3 (M) | 1.8 ± 0.6 (A) |
| Single-layer product (coupon), blue light (460 nm) | | | | |
| 14 d standard conditions | 3.3 ± 0.5 (A) | 1.9 ± 0.3 (A) | 2.6 ± 0.4 (A) | 1.6 ± 0.7 (A) |
| 14 d standard conditions// 3 d 60° C./95% r.h. | 3.0 ± 0.5 (A) | 1.7 ± 0.4 (A) | 2.2 ± 0.5 (A) | 1.5 ± 0.7 (A) |
| 6 months standard conditions | 3.0 ± 0.3 (M) | 1.7 ± 0.4 (A) | 2.4 ± 0.5 (M) | 1.3 ± 0.5 (M) |
| 6 months standard conditions// 3 d 60° C./95% r.h. | 3.3 ± 0.3 (M) | 1.5 ± 0.5 (A) | 2.4 ± 0.8 (A) | 1.1 ± 0.5 (A) |
| 14 d standard conditions | 3.7 ± 0.5 (A) | 2.5 ± 0.4 (A) | 2.8 ± 0.6 (A) | 2.4 ± 0.8 (A) |
| 14 d standard conditions// 3 d 60° C./95% r.h. | 3.5 ± 0.5 (A) | 2.3 ± 0.3 (A) | 2.7 ± 0.3 (A) | 1.8 ± 0.5 (A) |
| 6 months standard conditions | 3.6 ± 0.6 (M) | 2.4 ± 0.2 (A) | 2.7 ± 0.2 (M) | 1.9 ± 0.7 (M) |
| 6 months standard conditions// 3 d 60° C./95% r.h. | 3.1 ± 0.8 (M) | 2.4 ± 0.9 (A) | 2.3 ± 0.4 (A) | 1.6 ± 0.6 (A) |
| Three-layer product (ring), blue light (460 nm) | | | | |
| 14 d standard conditions | 3.5 ± 0.6 (A) | 2.4 ± 0.5 (A) | 2.4 ± 0.5 (A) | 2.6 ± 0.6 (A) |
| 14 d standard conditions// 3 d 60° C./95% r.h. | 3.3 ± 0.6 (A) | 2.2 ± 0.6 (A) | 2.0 ± 0.4 (A) | 2.4 ± 0.4 (A) |
| 6 months standard conditions | 3.1 ± 0.4 (M) | 2.2 ± 0.5 (A) | 2.0 ± 0.3 (M) | 1.8 ± 0.6 (A) |
| 6 months standard conditions// 3 d 60° C./95% r.h. | 3.4 ± 0.5 (M) | 2.6 ± 0.5 (A) | 1.9 ± 0.8 (A) | 2.1 ± 0.7 (A) |

Example 5

| Unit | Test specimen | | | |
|---|---|---|---|---|
| | PC/PC [MPa] | PC/PA [MPa] | PC/Al [MPa] | Steel/steel [MPa] |
| Single-layer product (coupon), UV light (365 nm) | | | | |
| 14 d standard conditions | 2.2 ± 0.5 (A) | 1.8 ± 0.5 (A) | 1.7 ± 0.4 (A) | 1.6 ± 0.6 (A) |
| 14 d standard conditions// 3 d 60° C./95% r.h. | 1.9 ± 0.3 (A) | 1.5 ± 0.5 (A) | 1.4 ± 0.5 (A) | 1.4 ± 0.6 (A) |
| 6 months standard conditions | 1.8 ± 0.3 (A) | 1.6 ± 0.4 (A) | 1.6 ± 0.5 (A) | 1.3 ± 0.4 (A) |
| 6 months standard conditions// 3 d 60° C./95% r.h. | 1.7 ± 0.6 (A) | 1.6 ± 0.6 (A) | 1.3 ± 0.4 (A) | 1.5 ± 0.7 (A) |
| Single-layer product (coupon), blue light (460 nm) | | | | |
| 14 d standard conditions | 2.0 ± 0.4 (A) | 1.9 ± 0.4 (A) | 1.4 ± 0.4 (A) | 1.6 ± 0.7 (A) |
| 14 d standard conditions// 3 d 60° C./95% r.h. | 1.8 ± 0.4 (A) | 1.6 ± 0.3 (A) | 1.5 ± 0.6 (A) | 1.5 ± 0.4 (A) |
| 6 months standard conditions | 1.9 ± 0.5 (M) | 1.9 ± 0.6 (A) | 1.3 ± 0.5 (A) | 1.4 ± 0.6 (A) |
| 6 months standard conditions// 3 d 60° C./95% r.h. | 1.8 ± 0.8 (M) | 1.8 ± 0.5 (A) | 1.4 ± 0.5 (A) | 1.6 ± 0.6 (A) |

-continued

|  | Test specimen | | | |
|---|---|---|---|---|
| Unit | PC/PC [MPa] | PC/PA [MPa] | PC/Al [MPa] | Steel/steel [MPa] |
| Three-layer product (ring), UV light (365 nm) | | | | |
| 14 d standard conditions | 2.5 ± 0.4 (A) | 2.0 ± 0.5 (A) | 1.9 ± 0.4 (A) | 2.0 ± 0.7 (A) |
| 14 d standard conditions// 3 d 60° C./95% r.h. | 2.3 ± 0.4 (A) | 1.9 ± 0.4 (A) | 1.9 ± 0.4 (A) | 1.5 ± 0.7 (A) |
| 6 months standard conditions | 2.0 ± 0.5 (M) | 1.9 ± 0.3 (A) | 1.5 ± 0.5 (A) | 1.4 ± 0.6 (A) |
| 6 months standard conditions// 3 d 60° C./95% r.h. | 2.2 ± 0.4 (M) | 2.2 ± 0.7 (A) | 1.8 ± 0.7 (A) | 1.8 ± 0.6 (A) |
| Three-layer product (ring), blue light (460 nm) | | | | |
| 14 d standard conditions | 2.3 ± 0.4 (A) | 1.9 ± 0.3 (A) | 1.8 ± 0.5 (A) | 1.9 ± 0.5 (A) |
| 14 d standard conditions// 3 d 60° C./95% r.h. | 2.1 ± 0.5 (A) | 1.6 ± 0.5 (A) | 1.5 ± 0.3 (A) | 1.5 ± 0.7 (A) |
| 6 months standard conditions | 1.9 ± 0.3 (M) | 1.8 ± 0.6 (A) | 1.7 ± 0.4 (A) | 1.8 ± 0.8 (A) |
| 6 months standard conditions// 3 d 60° C./95% r.h. | 1.8 ± 0.6 (M) | 1.6 ± 0.6 (A) | 1.7 ± 0.7 (A) | 1.6 ± 0.6 (A) |

Example 6

|  | Test specimen | | | |
|---|---|---|---|---|
| Unit | PC/PC [MPa] | PC/PA [MPa] | PC/Al [MPa] | Steel/steel [MPa] |
| Single-layer product (coupon), UV light (365 nm) | | | | |
| 14 d standard conditions | 6.9 ± 0.5 (C) | 5.1 ± 0.6 (C) | 7.2 ± 0.5 (C) | 7.3 ± 0.5 (C) |
| 14 d standard conditions// 3 d 60° C./95% r.h. | 6.0 ± 0.4 (C) | 6.5 ± 0.4 (C) | 6.3 ± 0.7 (C) | 7.9 ± 0.6 (C) |
| 6 months standard conditions | 6.6 ± 0.6 (C) | 5.2 ± 0.6 (C) | 7.0 ± 0.7 (C) | 6.9 ± 0.6 (C) |
| 6 months standard conditions// 3 d 60° C./95% r.h. | 6.3 ± 0.7 (C) | 6.0 ± 0.5 (C) | 6.5 ± 0.8 (C) | 7.0 ± 0.7 (C) |
| Single-layer product (coupon), blue light (460 nm) | | | | |
| 14 d standard conditions | 7.5 ± 0.4 (C) | 5.5 ± 0.5 (C) | 7.0 ± 0.5 (C) | 7.7 ± 0.4 (C) |
| 14 d standard conditions// 3 d 60° C./95% r.h. | 6.6 ± 0.6 (C) | 6.0 ± 0.3 (C) | 6.8 ± 0.5 (C) | 8.5 ± 0.5 (C) |
| 6 months standard conditions | 6.9 ± 0.6 (C) | 5.3 ± 0.5 (C) | 6.8 ± 0.7 (C) | 7.9 ± 0.5 (C) |
| 6 months standard conditions// 3 d 60° C./95% r.h. | 6.1 ± 0.4 (C) | 6.2 ± 0.5 (C) | 6.5 ± 0.4 (C) | 8.4 ± 0.7 (C) |
| Three-layer product (ring), UV light (365 nm) | | | | |
| 14 d standard conditions | 8.0 ± 0.5 (C) | 5.8 ± 0.3 (C) | 7.6 ± 0.3 (C) | 7.9 ± 0.3 (C) |
| 14 d standard conditions// 3 d 60° C./95% r.h. | 6.9 ± 0.5 (C) | 6.1 ± 0.5 (C) | 6.5 ± 0.2 (C) | 8.3 ± 0.7 (C) |
| 6 months standard conditions | 7.7 ± 0.5 (C) | 5.9 ± 0.4 (C) | 7.1 ± 0.5 (C) | 7.3 ± 0.4 (C) |
| 6 months standard conditions// 3 d 60° C./95% r.h. | 7.3 ± 0.7 (C) | 6.0 ± 0.6 (C) | 6.3 ± 0.5 (C) | 7.9 ± 0.8 (C) |
| Three-layer product (ring), blue light (460 nm) | | | | |
| 14 d standard conditions | 8.3 ± 0.5 (C) | 5.9 ± 0.3 (C) | 7.6 ± 0.3 (C) | 8.4 ± 0.3 (C) |
| 14 d standard conditions// 3 d 60° C./95% r.h. | 7.0 ± 0.6 (C) | 6.5 ± 0.4 (C) | 6.6 ± 0.3 (C) | 9.1 ± 0.4 (C) |
| 6 months standard conditions | 8.1 ± 0.4 (C) | 5.8 ± 0.4 (C) | 7.0 ± 0.3 (C) | 8.7 ± 0.4 (C) |
| 6 months standard conditions// 3 d 60° C./95% r.h. | 7.6 ± 0.5 (C) | 6.2 ± 0.5 (C) | 6.2 ± 0.7 (C) | 8.9 ± 0.6 (C) |

Example 7

| Unit | Test specimen | | | |
|---|---|---|---|---|
| | PC/PC [MPa] | PC/PA [MPa] | PC/Al [MPa] | Steel/steel [MPa] |
| Single-layer product (coupon), UV light (365 nm) | | | | |
| 14 d standard conditions | 2.6 ± 0.3 (M) | 2.4 ± 0.4 (M) | 2.6 ± 0.4 (M) | 2.9 ± 0.6 (M) |
| 14 d standard conditions// 3 d 60° C./95% r.h. | 1.9 ± 0.2 (A) | 1.8 ± 0.2 (A) | 1.9 ± 0.5 (A) | 2.1 ± 0.3 (A) |
| 6 months standard conditions | 2.2 ± 0.5 (M) | 2.4 ± 0.4 (M) | 2.4 ± 0.3 (M) | 2.5 ± 0.3 (M) |
| 6 months standard conditions// 3 d 60° C./95% r.h. | 2.1 ± 0.5 (M) | 1.9 ± 0.3 (A) | 2.0 ± 0.4 (M) | 2.3 ± 0.4 (M) |
| Single-layer product (coupon), blue light (460 nm) | | | | |
| 14 d standard conditions | 2.8 ± 0.2 (M) | 2.4 ± 0.5 (M) | 2.9 ± 0.3 (M) | 3.4 ± 0.5 (C) |
| 14 d standard conditions// 3 d 60° C./95% r.h. | 2.0 ± 0.3 (A) | 1.7 ± 0.4 (A) | 2.1 ± 0.3 (A) | 2.5 ± 0.4 (A) |
| 6 months standard conditions | 2.6 ± 0.4 (M) | 2.4 ± 0.3 (M) | 2.6 ± 0.5 (M) | 2.9 ± 0.2 (C) |
| 6 months standard conditions// 3 d 60° C./95% r.h. | 2.4 ± 0.5 (M) | 1.9 ± 0.6 (A) | 2.1 ± 0.5 (A) | 2.3 ± 0.7 (M) |
| Three-layer product (ring), UV light (365 nm) | | | | |
| 14 d standard conditions | 3.4 ± 0.2 (C) | 2.6 ± 0.5 (M) | 2.5 ± 0.3 (M) | 3.1 ± 0.5 (M) |
| 14 d standard conditions// 3 d 60° C./95% r.h. | 2.5 ± 0.3 (A) | 1.9 ± 0.4 (A) | 1.9 ± 0.4 (A) | 2.4 ± 0.4 (A) |
| 6 months standard conditions | 3.2 ± 0.6 (M) | 2.4 ± 0.3 (A) | 2.2 ± 0.3 (M) | 3.0 ± 0.6 (M) |
| 6 months standard conditions// 3 d 60° C./95% r.h. | 2.9 ± 0.5 (M) | 2.0 ± 0.5 (A) | 1.8 ± 0.3 (A) | 2.7 ± 0.8 (M) |
| Three-layer product (ring), blue light (460 nm) | | | | |
| 14 d standard conditions | 3.2 ± 0.3 (C) | 2.2 ± 0.3 (M) | 2.6 ± 0.5 (M) | 3.4 ± 0.4 (M) |
| 14 d standard conditions// 3 d 60° C./95% r.h. | 2.5 ± 0.5 (A) | 1.7 ± 0.4 (A) | 2.1 ± 0.5 (A) | 2.6 ± 0.5 (M) |
| 6 months standard conditions | 3.5 ± 0.6 (M) | 2.4 ± 0.3 (M) | 2.1 ± 0.3 (M) | 2.8 ± 0.6 (M) |
| 6 months standard conditions// 3 d 60° C./95% r.h. | 3.3 ± 0.6 (M) | 2.1 ± 0.3 (A) | 2.2 ± 0.6 (A) | 2.9 ± 0.8 (M) |

Example 8

| Unit | Test specimen | | | |
|---|---|---|---|---|
| | PC/PC [MPa] | PC/PA [MPa] | PC/Al [MPa] | Steel/steel [MPa] |
| Single-layer product (coupon), UV light (365 nm) | | | | |
| 14 d standard conditions | 6.1 ± 0.4 (C) | 3.9 ± 0.5 (M) | 3.5 ± 0.4 (M) | 4.8 ± 0.5 (C) |
| 14 d standard conditions// 3 d 60° C./95% r.h. | 5.2 ± 0.6 (M) | 3.3 ± 0.4 (A) | 2.7 ± 0.6 (A) | 4.0 ± 0.4 (M) |
| 6 months standard conditions | 5.9 ± 0.2 (C) | 4.0 ± 0.4 (M) | 3.3 ± 0.4 (C) | 4.6 ± 0.3 (C) |
| 6 months standard conditions + 3 d 60° C./95% r.h. | 5.3 ± 0.7 (M) | 3.6 ± 0.8 (A) | 3.0 ± 0.9 (A) | 3.6 ± 0.8 (M) |
| Single-layer product (coupon), blue light (460 nm) | | | | |
| 14 d standard conditions | 6.0 ± 0.2 (C) | 3.6 ± 0.3 (M) | 3.9 ± 0.5 (M) | 4.7 ± 0.5 (C) |
| 14 d standard conditions// 3 d 60° C./95% r.h. | 5.2 ± 0.5 (C) | 3.2 ± 0.4 (A) | 3.1 ± 0.4 (A) | 4.3 ± 0.5 (C) |
| 6 months standard conditions | 5.5 ± 0.4 (C) | 3.2 ± 0.6 (M) | 3.5 ± 0.3 (M) | 4.2 ± 0.4 (C) |
| 6 months standard conditions// 3 d 60° C./95% r.h. | 4.6 ± 0.8 (C) | 3.0 ± 0.5 (A) | 3.3 ± 0.4 (M) | 4.0 ± 0.7 (C) |
| Three-layer product (ring), UV light (365 nm) | | | | |
| 14 d standard conditions | 6.6 ± 0.3 (C) | 4.5 ± 0.3 (M) | 4.0 ± 0.3 (M) | 5.0 ± 0.5 (C) |
| 14 d standard conditions// 3 d 60° C./95% r.h. | 5.4 ± 0.5 (C) | 3.8 ± 0.6 (A) | 3.4 ± 0.7 (A) | 4.3 ± 0.5 (C) |
| 6 months standard conditions | 5.9 ± 0.3 (C) | 4.2 ± 0.5 (M) | 4.3 ± 0.6 (M) | 5.2 ± 0.6 (C) |
| 6 months standard conditions// 3 d 60° C./95% r.h. | 5.1 ± 0.6 (C) | 3.9 ± 0.6 (A) | 4.0 ± 0.6 (M) | 4.8 ± 0.4 (C) |

-continued

|  | Test specimen | | | |
|---|---|---|---|---|
| Unit | PC/PC [MPa] | PC/PA [MPa] | PC/Al [MPa] | Steel/steel [MPa] |
| Three-layer product (ring), blue light (460 nm) | | | | |
| 14 d standard conditions | 6.3 ± 0.4 (C) | 3.9 ± 0.4 (M) | 4.3 ± 0.3 (M) | 5.6 ± 0.3 (C) |
| 14 d standard conditions// 3 d 60° C./95% r.h. | 5.5 ± 0.3 (C) | 3.0 ± 0.6 (A) | 3.3 ± 0.6 (A) | 4.9 ± 0.3 (C) |
| 6 months standard conditions | 5.8 ± 0.5 (M) | 3.3 ± 0.4 (M) | 3.9 ± 0.4 (M) | 5.0 ± 0.7 (C) |
| 6 months standard conditions// 3 d 60° C./95% r.h. | 5.6 ± 0.9 (C) | 3.2 ± 0.5 (A) | 3.5 ± 0.7 (A) | 4.8 ± 0.9 (C) |

Example 9

|  | Test specimen | | | |
|---|---|---|---|---|
| Unit | PC/PC [MPa] | PC/PA [MPa] | PC/Al [MPa] | Steel/steel [MPa] |
| Single-layer product (coupon), UV light (365 nm) | | | | |
| 14 d standard conditions | 8.5 ± 0.9 (C) | 3.5 ± 1.5 (C) | 5.0 ± 0.9 (C) | 7.7 ± 0.5 (C) |
| 14 d standard conditions// 3 d 60° C./95% r.h. | 7.0 ± 1.3 (C) | 2.9 ± 1.5 (C) | 5.2 ± 1.1 (C) | 7.9 ± 0.8 (C) |
| 6 months standard conditions | 7.9 ± 1.2 (C) | 3.0 ± 1.8 (C) | 5.3 ± 0.7 (C) | 8.1 ± 0.7 (C) |
| 6 months standard conditions// 3 d 60° C./95% r.h. | 7.2 ± 1.0 (C) | 2.7 ± 1.1 (C) | 5.0 ± 1.2 (C) | 7.4 ± 0.9 (C) |
| Single-layer product (coupon), blue light (460 nm) | | | | |
| 14 d standard conditions | 8.9 ± 0.8 (C) | 3.7 ± 1.6 (C) | 5.3 ± 0.7 (C) | 8.7 ± 0.4 (C) |
| 14 d standard conditions// 3 d 60° C./95% r.h. | 7.2 ± 1.0 (C) | 3.1 ± 1.8 (C) | 5.7 ± 1.0 (C) | 8.5 ± 0.5 (C) |
| 6 months standard conditions | 7.8 ± 1.1 (C) | 3.5 ± 1.9 (C) | 5.5 ± 0.8 (C) | 8.0 ± 0.7 (C) |
| 6 months standard conditions// 3 d 60° C./95% r.h. | 7.4 ± 0.8 (C) | 3.3 ± 1.3 (C) | 5.8 ± 1.5 (C) | 8.4 ± 0.8 (C) |
| Three-layer product (ring), UV light (365 nm) | | | | |
| 14 d standard conditions | 10.1 ± 1.3 (C) | 3.7 ± 1.8 (C) | 7.2 ± 1.1 (C) | 8.5 ± 0.7 (C) |
| 14 d standard conditions// 3 d 60° C./95% r.h. | 9.1 ± 1.5 (C) | 4.0 ± 1.3 (C) | 6.9 ± 1.4 (C) | 8.5 ± 0.9 (C) |
| 6 months standard conditions | 9.2 ± 1.5 (C) | 3.1 ± 2.0 (C) | 6.4 ± 0.7 (C) | 8.0 ± 0.5 (C) |
| 6 months standard conditions// 3 d 60° C./95% r.h. | 8.3 ± 1.0 (C) | 3.4 ± 0.8 (C) | 6.0 ± 1.1 (C) | 7.6 ± 1.4 (C) |
| Three-layer product (ring), blue light (460 nm) | | | | |
| 14 d standard conditions | 10.5 ± 1.0 (C) | 4.0 ± 2.0 (C) | 6.0 ± 1.0 (C) | 9.0 ± 0.5 (C) |
| 14 d standard conditions// 3 d 60° C./95% r.h. | 8.4 ± 1.2 (C) | 5.1 ± 2.3 (C) | 5.8 ± 1.1 (C) | 8.1 ± 0.6 (C) |
| 6 months standard conditions | 9.9 ± 1.3 (C) | 3.8 ± 2.4 (C) | 5.7 ± 0.8 (C) | 8.8 ± 0.4 (C) |
| 6 months standard conditions// 3 d 60° C./95% r.h. | 9.1 ± 1.0 (C) | 4.2 ± 0.8 (C) | 5.3 ± 1.4 (C) | 8.4 ± 0.9 (C) |

Example 10

| Unit | Test specimen | | | |
|---|---|---|---|---|
| | PC/PC [MPa] | PC/PA [MPa] | PC/Al [MPa] | Steel/steel [MPa] |
| Single-layer product (coupon), UV light (365 nm) | | | | |
| 14 d standard conditions | 2.2 ± 0.6 (M) | 3.7 ± 0.8 (M) | 2.9 ± 0.6 (M) | 6.7 ± 0.9 (C) |
| 14 d standard conditions// 3 d 60° C./95% r.h. | 3.5 ± 0.6 (M) | 2.7 ± 0.8 (M) | 3.3 ± 0.6 (M) | 5.2 ± 0.9 (C) |
| 6 months standard conditions | 2.0 ± 0.7 (M) | 3.8 ± 0.5 (M) | 2.6 ± 0.5 (M) | 6.3 ± 0.8 (C) |
| 6 months standard conditions// 3 d 60° C./95% r.h. | 3.2 ± 0.9 (M) | 2.9 ± 0.7 (M) | 3.1 ± 0.5 (M) | 5.5 ± 1.0 (C) |
| Single-layer product (coupon), blue light (460 nm) | | | | |
| 14 d standard conditions | 2.0 ± 0.5 (M) | 3.8 ± 0.6 (M) | 3.0 ± 0.4 (C) | 6.2 ± 0.5 (C) |
| 14 d standard conditions// 3 d 60° C./95% r.h. | 3.4 ± 0.7 (M) | 2.9 ± 0.7 (M) | 3.6 ± 0.7 (M) | 5.0 ± 0.5 (C) |
| 6 months standard conditions | 2.4 ± 0.4 (M) | 3.3 ± 0.8 (M) | 2.9 ± 0.4 (M) | 5.6 ± 0.5 (C) |
| 6 months standard conditions// 3 d 60° C./95% r.h. | 3.7 ± 0.7 (M) | 2.8 ± 0.9 (M) | 2.9 ± 0.5 (M) | 4.8 ± 0.8 (C) |
| Three-layer product (ring), UV light (365 nm) | | | | |
| 14 d standard conditions | 2.4 ± 0.5 (M) | 3.9 ± 0.6 (C) | 3.4 ± 0.4 (C) | 6.9 ± 0.5 (C) |
| 14 d standard conditions// 3 d 60° C./95% r.h. | 3.6 ± 0.7 (C) | 3.1 ± 0.7 (C) | 3.7 ± 0.7 (C) | 5.5 ± 0.5 (C) |
| 6 months standard conditions | 2.7 ± 0.4 (M) | 3.4 ± 0.8 (M) | 2.7 ± 0.4 (M) | 6.3 ± 0.5 (C) |
| 6 months standard conditions// 3 d 60° C./95% r.h. | 3.6 ± 0.5 (M) | 2.9 ± 0.4 (M) | 3.1 ± 0.9 (M) | 5.1 ± 0.4 (C) |
| Three-layer product (ring), blue light (460 nm) | | | | |
| 14 d standard conditions | 2.3 ± 0.6 (M) | 3.7 ± 0.5 (C) | 3.4 ± 0.9 (C) | 6.0 ± 0.4 (C) |
| 14 d standard conditions// 3 d 60° C./95% r.h. | 3.0 ± 0.4 (M) | 3.0 ± 0.4 (M) | 3.5 ± 0.8 (M) | 5.2 ± 0.7 (C) |
| 6 months standard conditions | 2.0 ± 0.5 (M) | 3.1 ± 0.5 (M) | 3.3 ± 0.6 (M) | 5.5 ± 0.6 (C) |
| 6 months standard conditions// 3 d 60° C./95% r.h. | 3.4 ± 0.6 (C) | 2.9 ± 0.6 (M) | 3.3 ± 0.9 (M) | 4.9 ± 0.6 (C) |

Example 11

| Unit | Test specimen | | | |
|---|---|---|---|---|
| | PC/PC [MPa] | PC/PA [MPa] | PC/Al [MPa] | Steel/steel [MPa] |
| Single-layer product (coupon), UV light (365 nm) | | | | |
| 14 d standard conditions | 2.5 ± 0.7 (A) | 2.1 ± 0.8 (A) | 2.3 ± 0.4 (A) | 2.7 ± 0.6 (A) |
| 14 d standard conditions// 3 d 60° C./95% r.h. | 2.3 ± 0.6 (A) | 2.0 ± 0.7 (A) | 2.1 ± 0.7 (A) | 2.6 ± 0.6 (A) |
| 6 months standard conditions | 1.3 ± 0.5 (A) | 1.1 ± 0.5 (A) | 1.2 ± 0.6 (A) | 1.7 ± 0.6 (A) |
| 6 months standard conditions// 3 d 60° C./95% r.h. | 1.1 ± 0.6 (A) | 1.3 ± 0.7 (A) | 1.1 ± 0.5 (A) | 2.1 ± 0.7 (A) |
| Single-layer product (coupon), blue light (460 nm) | | | | |
| 14 d standard conditions | 2.4 ± 0.5 (A) | 2.3 ± 0.6 (A) | 2.5 ± 0.7 (A) | 2.3 ± 0.7 (A) |
| 14 d standard conditions// 3 d 60° C./95% r.h. | 2.1 ± 0.7 (A) | 1.8 ± 0.7 (A) | 2.0 ± 0.8 (A) | 2.4 ± 0.7 (A) |
| 6 months standard conditions | 1.1 ± 0.5 (A) | 1.0 ± 0.5 (A) | 0.9 ± 0.6 (A) | 1.0 ± 0.6 (A) |
| 6 months standard conditions// 3 d 60° C./95% r.h. | 1.0 ± 0.5 (A) | 0.9 ± 0.7 (A) | 0.8 ± 0.8 (A) | 1.1 ± 0.8 (A) |
| Three-layer product (ring), UV light (365 nm) | | | | |
| 14 d standard conditions | 2.4 ± 0.6 (A) | 1.9 ± 0.9 (A) | 2.2 ± 0.7 (A) | 2.8 ± 0.6 (A) |
| 14 d standard conditions// 3 d 60° C./95% r.h. | 2.3 ± 0.7 (A) | 2.1 ± 0.7 (A) | 2.2 ± 0.6 (A) | 2.9 ± 0.6 (A) |
| 6 months standard conditions | 1.1 ± 0.6 (A) | 0.9 ± 0.6 (A) | 0.8 ± 0.6 (A) | 1.5 ± 0.9 (A) |
| 6 months standard conditions// 3 d 60° C./95% r.h. | 1.1 ± 0.8 (A) | 1.1 ± 0.8 (A) | 0.7 ± 0.7 (A) | 1.6 ± 0.7 (A) |

-continued

| Unit | Test specimen | | | |
|---|---|---|---|---|
| | PC/PC [MPa] | PC/PA [MPa] | PC/Al [MPa] | Steel/steel [MPa] |
| | Three-layer product (ring), blue light (460 nm) | | | |
| 14 d standard conditions | 2.6 ± 0.7 (A) | 2.2 ± 0.9 (A) | 2.7 ± 1.0 (A) | 2.9 ± 0.9 (A) |
| 14 d standard conditions// 3 d 60° C./95% r.h. | 2.6 ± 0.9 (A) | 2.1 ± 1.1 (A) | 2.4 ± 0.8 (A) | 2.8 ± 0.7 (A) |
| 6 months standard conditions | 0.9 ± 0.6 (A) | 1.1 ± 0.5 (A) | 1.3 ± 0.9 (A) | 1.4 ± 0.8 (A) |
| 6 months standard conditions// 3 d 60° C./95% r.h. | 1.0 ± 0.9 (A) | 0.9 ± 0.7 (A) | 0.9 ± 0.5 (A) | 1.5 ± 0.5 (A) |

COMPARATIVE EXAMPLES

For all Comparative Examples:
Mean values from 3 individual determinations with standard deviation in each case.
Fracture Modes:
   A=adhesive
   K=cohesive
   M=mixed fracture Comparative Example 1

| Unit | Test specimen | | | |
|---|---|---|---|---|
| | PC/PC [MPa] | PC/PA [MPa] | PC/Al [MPa] | Steel/steel [MPa] |
| | Single-layer product (coupon), UV light (365 nm) | | | |
| 14 d standard conditions | 4.3 ± 0.7 (C) | 2.7 ± 0.8 (M) | 3.3 ± 0.7 (M) | 3.9 ± 0.9 (C) |
| 14 d standard conditions// 3 d 60° C./95% r.h. | 0.9 ± 0.6 (A) | 0.5 ± 0.3 (A) | 0.4 ± 0.4 (A) | 1.1 ± 0.7 (A) |
| 6 months standard conditions | 3.6 ± 0.5 (C) | 2.4 ± 0.7 (M) | 3.0 ± 0.6 (M) | 3.2 ± 1.0 (C) |
| 6 months standard conditions// 3 d 60° C./95% r.h. | 0.4 ± 0.3 (A) | 0.3 ± 0.2 (A) | 0.4 ± 0.3 (A) | 0.6 ± 0.4 (A) |
| | Single-layer product (coupon), blue light (460 nm) | | | |
| 14 d standard conditions | 4.6 ± 0.4 (C) | 3.2 ± 0.5 (M) | 3.8 ± 0.6 (M) | 4.3 ± 0.7 (C) |
| 14 d standard conditions// 3 d 60° C./95% r.h. | 0.4 ± 0.3 (A) | 0.3 ± 0.3 (A) | 0.6 ± 0.3 (A) | 0.8 ± 0.5 (A) |
| 6 months standard conditions | 4.7 ± 0.6 (C) | 3.0 ± 0.4 (M) | 3.3 ± 0.5 (M) | 3.4 ± 0.7 (C) |
| 6 months standard conditions// 3 d 60° C./95% r.h. | 0.3 ± 0.2 (A) | 0.2 ± 0.2 (A) | 0.3 ± 0.2 (A) | 0.7 ± 0.3 (A) |
| | Three-layer product (ring), UV light (365 nm) | | | |
| 14 d standard conditions | 4.4 ± 0.5 (C) | 2.9 ± 0.5 (A) | 3.1 ± 0.7 (A) | 3.4 ± 0.6 (M) |
| 14 d standard conditions// 3 d 60° C./95% r.h. | 0.5 ± 0.4 (A) | 0.3 ± 0.2 (A) | 0.5 ± 0.3 (A) | 0.6 ± 0.4 (A) |
| 6 months standard conditions | 4.0 ± 0.6 (C) | 3.0 ± 0.4 (A) | 2.9 ± 0.5 (A) | 3.6 ± 0.7 (C) |
| 6 months standard conditions// 3 d 60° C./95% r.h. | 0.4 ± 0.3 (A) | 0.3 ± 0.2 (A) | 0.4 ± 0.2 (A) | 0.5 ± 0.4 (A) |
| | Three-layer product (ring), blue light (460 nm) | | | |
| 14 d standard conditions | 4.9 ± 0.8 (C) | 3.0 ± 0.6 (A) | 3.6 ± 0.5 (M) | 3.8 ± 0.5 (M) |
| 14 d standard conditions// 3 d 60° C./95% r.h. | 0.6 ± 0.5 (A) | 0.4 ± 0.2 (A) | 0.7 ± 0.4 (A) | 0.7 ± 0.4 (A) |
| 6 months standard conditions | 4.4 ± 0.7 (C) | 2.6 ± 0.8 (A) | 2.8 ± 0.6 (A) | 3.9 ± 0.8 (C) |
| 6 months standard conditions// 3 d 60° C./95% r.h. | 0.5 ± 0.3 (A) | 0.2 ± 0.1 (A) | 0.5 ± 0.3 (A) | 0.7 ± 0.3 (A) |

Comparative Example 2

| Unit | Test specimen | | | |
|---|---|---|---|---|
| | PC/PC [MPa] | PC/PA [MPa] | PC/Al [MPa] | Steel/steel [MPa] |
| Single-layer product (coupon), UV light (365 nm) | | | | |
| 14 d standard conditions | 3.9 ± 0.5 (C) | 2.4 ± 0.4 (M) | 2.9 ± 0.4 (M) | 3.5 ± 0.3 (C) |
| 14 d standard conditions// 3 d 60° C./95% r.h. | 0.7 ± 0.6 (A) | 0.3 ± 0.2 (A) | 0.4 ± 0.1 (A) | 0.8 ± 0.2 (A) |
| 6 months standard conditions | 3.7 ± 0.5 (C) | 2.0 ± 0.6 (A) | 2.8 ± 0.5 (M) | 3.2 ± 0.6 (C) |
| 6 months standard conditions// 3 d 60° C./95% r.h. | 0.7 ± 0.2 (A) | 0.4 ± 0.2 (A) | 0.6 ± 0.3 (A) | 0.7 ± 0.4 (A) |
| Single-layer product (coupon), blue light (460 nm) | | | | |
| 14 d standard conditions | 4.2 ± 0.9 (C) | 2.7 ± 0.5 (M) | 2.8 ± 0.5 (M) | 3.3 ± 0.6 (C) |
| 14 d standard conditions// 3 d 60° C./95% r.h. | 0.4 ± 0.2 (A) | 0.2 ± 0.2 (A) | 0.3 ± 0.2 (A) | 0.5 ± 0.3 (A) |
| 6 months standard conditions | 4.3 ± 0.3 (C) | 2.5 ± 0.7 (A) | 2.6 ± 0.4 (M) | 3.5 ± 0.5 (C) |
| 6 months standard conditions// 3 d 60° C./95% r.h. | 0.5 ± 0.3 (A) | 0.3 ± 0.1 (A) | 0.7 ± 0.4 (A) | 0.6 ± 0.4 (A) |
| Three-layer product (ring), UV light (365 nm) | | | | |
| 14 d standard conditions | 3.8 ± 0.3 (C) | 2.4 ± 0.4 (M) | 2.5 ± 0.5 (M) | 3.7 ± 0.4 (C) |
| 14 d standard conditions// 3 d 60° C./95% r.h. | 0.5 ± 0.3 (A) | 0.4 ± 0.3 (A) | 0.5 ± 0.1 (A) | 0.6 ± 0.5 (A) |
| 6 months standard conditions | 4.0 ± 0.4 (C) | 2.8 ± 0.5 (A) | 2.5 ± 0.5 (A) | 3.4 ± 0.3 (C) |
| 6 months standard conditions// 3 d 60° C./95% r.h. | 0.3 ± 0.2 (A) | 0.3 ± 0.1 (A) | 0.5 ± 0.3 (A) | 0.7 ± 0.3 (A) |
| Three-layer product (ring), blue light (460 nm) | | | | |
| 14 d standard conditions | 4.5 ± 0.3 (C) | 2.9 ± 0.3 (M) | 2.7 ± 0.4 (M) | 3.6 ± 0.4 (C) |
| 14 d standard conditions// 3 d 60° C./95% r.h. | 0.8 ± 0.3 (A) | 0.3 ± 0.2 (A) | 0.3 ± 0.1 (A) | 0.6 ± 0.2 (A) |
| 6 months standard conditions | 4.1 ± 0.6 (C) | 2.3 ± 0.5 (A) | 2.7 ± 0.5 (M) | 3.1 ± 0.4 (C) |
| 6 months standard conditions// 3 d 60° C./95% r.h. | 0.9 ± 0.1 (A) | 0.5 ± 0.3 (A) | 0.4 ± 0.2 (A) | 0.6 ± 0.2 (A) |

Comparative Example 3

| Unit | Test specimen | | | |
|---|---|---|---|---|
| | PC/PC [MPa] | PC/PA [MPa] | PC/Al [MPa] | Steel/steel [MPa] |
| Single-layer product (coupon), UV light (365 nm) | | | | |
| 14 d standard conditions | 6.3 ± 0.4 (C) | 1.6 ± 0.3 (A) | 0.9 ± 0.4 (A) | 3.6 ± 0.6 (M) |
| 14 d standard conditions// 3 d 60° C./95% r.h. | 2.4 ± 0.5 (A) | 0.6 ± 0.3 (A) | 0.3 ± 0.2 (A) | 1.8 ± 0.4 (A) |
| 6 months standard conditions | 2.8 ± 0.5 (A) | 0.9 ± 0.7 (A) | 0.5 ± 0.2 (A) | 1.4 ± 0.4 (A) |
| 6 months standard conditions// 3 d 60° C./95% r.h. | 0.5 ± 0.3 (A) | 0.2 ± 0.1 (A) | 0.2 ± 0.1 (A) | 0.6 ± 0.2 (A) |
| Single-layer product (coupon), blue light (460 nm) | | | | |
| 14 d standard conditions | 6.6 ± 0.7 (C) | 1.9 ± 0.5 (A) | 1.1 ± 0.3 (A) | 3.7 ± 0.9 (C) |
| 14 d standard conditions// 3 d 60° C./95% r.h. | 3.7 ± 0.4 (A) | 0.7 ± 0.2 (A) | 0.6 ± 0.3 (A) | 1.3 ± 0.3 (A) |
| 6 months standard conditions | 2.4 ± 0.2 (A) | 0.8 ± 0.5 (A) | 0.6 ± 0.3 (A) | 1.1 ± 0.3 (A) |
| 6 months standard conditions// 3 d 60° C./95% r.h. | 0.6 ± 0.1 (A) | 0.4 ± 0.2 (A) | 0.4 ± 0.1 (A) | 0.5 ± 0.3 (A) |
| Three-layer product (ring), UV light (365 nm) | | | | |
| 14 d standard conditions | 6.0 ± 0.8 (C) | 1.9 ± 0.7 (A) | 0.8 ± 0.3 (A) | 3.2 ± 0.8 (M) |
| 14 d standard conditions// 3 d 60° C./95% r.h. | 2.1 ± 0.6 (A) | 0.9 ± 0.3 (A) | 0.5 ± 0.3 (A) | 1.1 ± 0.3 (A) |
| 6 months standard conditions | 2.0 ± 0.4 (A) | 1.0 ± 0.4 (A) | 0.6 ± 0.4 (A) | 1.1 ± 0.2 (A) |

-continued

|  | Test specimen | | | |
|---|---|---|---|---|
| Unit | PC/PC [MPa] | PC/PA [MPa] | PC/Al [MPa] | Steel/steel [MPa] |
| 6 months standard conditions// 3 d 60° C./95% r.h. | 0.3 ± 0.1 (A) | 0.1 ± 0.1 (A) | 0.3 ± 0.2 (A) | 0.5 ± 0.2 (A) |
| Three-layer product (ring), blue light (460 nm) | | | | |
| 14 d standard conditions | 6.6 ± 0.3 (C) | 2.3 ± 0.6 (A) | 1.2 ± 0.6 (A) | 3.9 ± 0.5 (M) |
| 14 d standard conditions// 3 d 60° C./95% r.h. | 3.2 ± 0.7 (A) | 1.8 ± 0.4 (A) | 0.7 ± 0.5 (A) | 2.3 ± 0.9 (A) |
| 6 months standard conditions | 2.3 ± 0.3 (A) | 0.5 ± 0.3 (A) | 0.4 ± 0.2 (A) | 1.1 ± 0.5 (A) |
| 6 months standard conditions// 3 d 60° C./95% r.h. | 0.4 ± 0.1 (A) | 0.1 ± 0.1 (A) | 0.2 ± 0.1 (A) | 0.5 ± 0.3 (A) |

Comparative Example 4

|  | Test specimen | | | |
|---|---|---|---|---|
| Unit | PC/PC [MPa] | PC/PA [MPa] | PC/Al [MPa] | Steel/steel [MPa] |
| Single-layer product (coupon), UV light (365 nm) | | | | |
| 14 d standard conditions | 5.2 ± 0.7 (C) | 1.5 ± 0.2 (A) | 1.6 ± 0.3 (A) | 3.0 ± 0.8 (M) |
| 14 d standard conditions// 3 d 60° C./95% r.h. | 0.7 ± 0.6 (A) | 0.3 ± 0.4 (A) | 0.4 ± 0.3 (A) | 0.6 ± 0.5 (A) |
| 6 months standard conditions | 2.2 ± 0.4 (A) | 0.7 ± 0.5 (A) | 0.8 ± 0.4 (A) | 1.8 ± 0.5 (A) |
| 6 months standard conditions// 3 d 60° C./95% r.h. | 0.4 ± 0.2 (A) | 0.1 ± 0.1 (A) | 0.2 ± 0.1 (A) | 0.4 ± 0.2 (A) |
| Single-layer product (coupon), blue light (460 nm) | | | | |
| 14 d standard conditions | 5.5 ± 0.5 (C) | 1.8 ± 0.5 (A) | 1.9 ± 0.4 (A) | 3.3 ± 0.6 (M) |
| 14 d standard conditions// 3 d 60° C./95% r.h. | 0.8 ± 0.3 (A) | 0.4 ± 0.1 (A) | 0.4 ± 0.2 (A) | 0.5 ± 0.2 (A) |
| 6 months standard conditions | 2.0 ± 0.3 (A) | 0.8 ± 0.4 (A) | 1.0 ± 0.3 (A) | 1.5 ± 0.5 (A) |
| 6 months standard conditions// 3 d 60° C./95% r.h. | 0.4 ± 0.1 (A) | 0.2 ± 0.1 (A) | 0.2 ± 0.2 (A) | 0.5 ± 0.2 (A) |
| Three-layer product (ring), UV light (365 nm) | | | | |
| 14 d standard conditions | 6.1 ± 0.1 (C) | 2.0 ± 0.4 (A) | 1.9 ± 0.4 (A) | 2.7 ± 0.5 (A) |
| 14 d standard conditions// 3 d 60° C./95% r.h. | 0.5 ± 0.3 (A) | 0.2 ± 0.4 (A) | 0.4 ± 0.4 (A) | 0.9 ± 0.4 (A) |
| 6 months standard conditions | 5.0 ± 0.6 (A) | 1.0 ± 0.5 (A) | 0.8 ± 0.6 (A) | 1.5 ± 0.4 (A) |
| 6 months standard conditions// 3 d 60° C./95% r.h. | 0.3 ± 0.1 (A) | 0.1 ± 0.1 (A) | 0.1 ± 0.1 (A) | 0.6 ± 0.3 (A) |
| Three-layer product (ring), blue light (460 nm) | | | | |
| 14 d standard conditions | 6.4 ± 0.4 (C) | 2.3 ± 0.6 (A) | 2.5 ± 0.4 (A) | 3.9 ± 0.5 (C) |
| 14 d standard conditions// 3 d 60° C./95% r.h. | 1.1 ± 0.4 (A) | 0.7 ± 0.1 (A) | 0.5 ± 0.1 (A) | 0.9 ± 0.3 (A) |
| 6 months standard conditions | 3.1 ± 0.7 (A) | 0.9 ± 0.8 (A) | 1.1 ± 0.5 (A) | 2.2 ± 0.4 (A) |
| 6 months standard conditions// 3 d 60° C./95% r.h. | 0.6 ± 0.3 (A) | 0.3 ± 0.3 (A) | 0.4 ± 0.2 (A) | 0.6 ± 0.2 (A) |

Discussion of the Results

The reactive adhesive film of the invention can be cured both with UV-LED light and with blue LED light. Following irradiation, the film does not cure right through immediately, but instead has an open time of at least 5 minutes. It continues to cure in the dark, and so is suitable for the bonding of non-transparent substrates. It constitutes a significant improvement on the prior art in that bonds with this film of adhesive are notable for high bond strength and high resistance to combined heat and humidity. This was demonstrated for bonds of polycarbonate (PC), polyamide (PA), aluminium and SUS steel. Preferred embodiments lead to higher bond strengths and/or more uniform results on the various substrates, and also to better storage stability.

The comparative examples, without the polymer of monomers comprising N-vinyl compounds, show that the resistance of the bonded assemblies to combined heat and humidity is inadequate. Particularly after a long storage time of the diecuts, replacing the polymer with monomeric N-vinylcaprolactam leads to inadequate resistance of the bonded assemblies to combined heat and humidity, and, generally, to inadequate storage stability of the diecuts.

The invention claimed is:

1. A single layer of a light-curing, reactive, pressure-sensitive adhesive film of adhesive, comprising
   (a) at least one reactive monomer or reactive resin,
   (b) an initiator,
   (c) a photoredox catalyst,
   (d) a polymer obtained by radical polymerization of monomers containing carbon-carbon double bonds, wherein the monomers comprise N-vinyl compounds containing a nitrogen atom directly bonded to a vinyl group,
   and
   (e) a film-forming polymer.

2. The single layer of a light-curing, reactive, pressure-sensitive adhesive film of adhesive according to claim 1, wherein the reactive monomer or reactive resin (a) comprises at least one representative selected from acrylic esters, methacrylic esters, vinyl compounds, oligomeric compounds having carbon-carbon double bonds, polymeric compounds having carbon-carbon double bonds, and crosslinking reactive monomers.

3. The single layer of a light-curing, reactive, pressure-sensitive adhesive film of adhesive according to claim 1, wherein the photoredox catalyst (c) comprises
   ruthenium as central atom and bipyridine or substituted bipyridine as ligand,
   or
   iridium as central atom and phenylpyridine or a substituted phenylpyridine as ligand.

4. The single layer of a light-curing, reactive, pressure-sensitive adhesive film of adhesive according to claim 1, wherein the photoredox catalyst (c) comprises [tris(2,2'-bipyridyl)ruthenium(II)]$^{2+}$, tris[2-(2,4-difluorophenyl)pyridine]iridium(III) or tris(2-phenylpyridinato)iridium(III).

5. The single layer of a light-curing, reactive, pressure-sensitive adhesive film of adhesive according to claim 1, wherein the N-vinyl compounds of the polymer (d) are compounds corresponding to the formula (II) or comprise a structural unit of the formula (II),

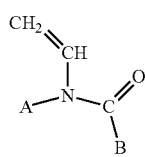

(II)

where
A is an organic radical R or H,
B is an organic radical R or H or OR or OH or NR$_2$ or NHR or NH$_2$,
R independently and at each occurrence is a substituted or unsubstituted branched, cyclic or linear C$_{1-20}$ alkyl radical or C$_{2-20}$ alkenyl radical; or is a substituted or unsubstituted aryl or heteroaryl,
optionally the organic radical A and the organic radical B form a ring.

6. The single layer of a light-curing, reactive, pressure-sensitive adhesive film of adhesive according to claim 1, wherein the N-vinyl compounds of the polymer (d) comprise N-vinylcaprolactam or N-vinylpyrrolidone or 5-methyl-3-vinyl-2-oxazolidinone.

7. The single layer of a light-curing, reactive, pressure-sensitive adhesive film of adhesive according to claim 1, wherein the film-forming polymer (e) comprises a thermoplastic polymer, an elastomer and/or a thermoplastic elastomer.

8. The single layer of a light-curing, reactive, pressure-sensitive adhesive film of adhesive according to claim 7, wherein the film-forming polymer (e) comprises a thermoplastic polyurethane.

9. The single layer of a light-curing, reactive, pressure-sensitive adhesive film of adhesive according to claim 1, comprising
   (a) 10 to 80 wt % of the at least one reactive monomer or reactive resin,
   (b) 0.1 to 10.0 wt % of the initiator,
   (c) up to 1.0 wt % of the photoredox catalyst,
   (d) 1.0 to 50.0 wt % of the polymer,
   (e) 10 to 90 wt % of the film-forming polymer.

10. The single layer of a light-curing, reactive, pressure-sensitive adhesive film of adhesive according to claim 9, comprising
    (a) 20 to 60 wt % of the at least one reactive monomer or reactive resin,
    (b) 0.2 to 4.0 wt % of the initiator,
    (c) up to 0.5 wt % of the photoredox catalyst,
    (d) 5.0 to 30.0 wt % of the polymer,
    (e) 20 to 60 wt % of the film-forming polymer.

11. The single layer of a light-curing, reactive, pressure-sensitive adhesive film of adhesive according to claim 1, further comprising films, foils, layers, carriers, films of adhesive, films of pressure-sensitive adhesive, release papers and/or release liners.

12. A reactive, pressure-sensitive adhesive tape comprising layers (A1), (A2) and (B), wherein the layer (B) is arranged flatly between the layers (A1) and (A2), wherein the layer (A1) is the single layer of a light-curing, reactive, pressure-sensitive adhesive film of adhesive according to claim 1; wherein the layer (B) is a film, a foil, or a carrier, and the layer (A2) is a reactive, pressure-sensitive adhesive film of adhesive.

13. A method for producing bonds on material selected from plastic, metal, glass and ceramic, which comprises applying the single layer of a reactive, pressure-sensitive adhesive film of adhesive according to claim 1 to said material.

14. A composite element comprising at least two bonding faces joined to one another by a cured product of the single layer of a reactive, pressure-sensitive adhesive film of adhesive according to claim 1.

15. The single layer of a light-curing, reactive, pressure-sensitive adhesive film of adhesive according to claim 2, wherein the crosslinking reactive monomers is selected from diacrylates, dimethacrylates, triacrylates, trimethacrylates, acrylates of higher functionality, and methacrylates of higher functionality.

16. The single layer of a light-curing, reactive, pressure-sensitive adhesive film of adhesive according to claim 2, wherein the crosslinking reactive monomers is selected from 2-phenoxyethyl acrylate, 2-phenoxyethyl methacrylate, 2-hydroxy-3-phenoxypropyl acrylate, 2-hydroxy-3-phenoxypropyl methacrylate, 2-[2-(methacryloyloxy)ethoxycarbonyl]benzoic acid, 2-[[(phenylamino)carbonyl]oxy]

ethyl methacrylate, 2-tert-butyl-6-[(3-tert-butyl-2-hydroxy-5-methylphenyl)methyl]-4-methyl-phenyl prop-2-enoate, (5-ethyl-1,3-dioxan-5-yl)methyl acrylate, (2-oxo-1,3-dioxolan-4-yl)methyl methacrylate, di(ethylene glycol) 2-ethylhexyl ether acrylate, (2,2-dimethyl-1,3-dioxolan-4-yl) methyl prop-2-enoate, 2-succinic acid mono-[2-(acryloyloxy)ethyl ester], succinic acid mono-[2-(methacryloyloxy)ethyl ester], (2,2-pentamethylene-1,3-oxazolid-3-yl)ethyl methacrylate, 2-hydroxy-3-(prop-2-enoyloxy)propyl 2-methyl-2-propylhexanoate, 2-[[(butylamino)carbonyl]oxy]ethyl acrylate, stearyl acrylate, stearyl methacrylate, diurethane dimethacrylate (isomer mixture), bisphenol A glycerolate dimethacrylate (BIS-GMA), bisphenol A dimethacrylate (BIS-DMA), ethylene glycol diacrylate, ethylene glycol dimethacrylate, trimethyloylpropane propoxylate triacrylate, trimethyloylpropane triacrylate and di(trimethylolpropane) tetraacrylate.

17. A method for producing bonds on material selected from plastic, metal, glass and ceramic, which comprises applying the reactive, pressure-sensitive adhesive tape according to claim 12 to said material.

18. A composite element comprising at least two bonding faces joined to one another by a cured product of the reactive, pressure-sensitive adhesive tape according to claim 12.

* * * * *